United States Patent
Silawan et al.

(10) Patent No.: US 9,453,657 B2
(45) Date of Patent: Sep. 27, 2016

(54) INFRARED DETECTING APPARATUS, INFRARED DETECTION METHOD, AND AIR-CONDITIONER

(71) Applicant: Panasonic Intellectual Property Management Co., Ltd., Osaka (JP)

(72) Inventors: Nawatt Silawan, Osaka (JP); Koichi Kusukame, Nara (JP); Hiroshi Yamanaka, Fukui (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/938,551

(22) Filed: Nov. 11, 2015

(65) Prior Publication Data
US 2016/0146665 A1    May 26, 2016

(30) Foreign Application Priority Data

Nov. 21, 2014 (JP) .................. 2014-236952
Jan. 21, 2015 (JP) .................. 2015-009870

(51) Int. Cl.
| | | |
|---|---|---|
| *G01J 5/02* | (2006.01) | |
| *F24F 11/053* | (2006.01) | |
| *G01J 5/04* | (2006.01) | |
| *G01J 5/00* | (2006.01) | |

(52) U.S. Cl.
CPC ............ *F24F 11/053* (2013.01); *G01J 5/0025* (2013.01); *G01J 5/025* (2013.01); *G01J 5/047* (2013.01); *G01J 2005/0077* (2013.01)

(58) Field of Classification Search
CPC .................................................... G02B 15/173
See application file for complete search history.

(56) References Cited

U.S. PATENT DOCUMENTS

| | | | |
|---|---|---|---|
| 5,629,516 A | 5/1997 | Olbertz | |
| 6,806,456 B1 | 10/2004 | Ye et al. | |
| 7,869,919 B1 * | 1/2011 | Kostrzewa | ............. B60R 11/04 359/514 |
| 2008/0165620 A1 | 7/2008 | Sugiura | |

FOREIGN PATENT DOCUMENTS

| | | |
|---|---|---|
| JP | 6-300624 | 10/1994 |
| JP | 10-019667 | 1/1998 |
| JP | 2000-046958 | 2/2000 |
| JP | 2004-251876 | 9/2004 |
| JP | 2007-024770 | 2/2007 |
| JP | 2009-128228 | 6/2009 |
| JP | 2010-216688 | 9/2010 |
| JP | 2012-145562 | 8/2012 |
| JP | 2012-220419 | 11/2012 |
| JP | 2013-044595 | 3/2013 |

* cited by examiner

*Primary Examiner* — Kiho Kim
(74) *Attorney, Agent, or Firm* — Greenblum & Bernstein, P.L.C.

(57) ABSTRACT

An infrared detecting apparatus includes an infrared sensor in which a plurality of infrared detecting elements are placed in a matrix, and also includes a scanner that moves the infrared sensor in a prescribed direction to cause the infrared sensor to scan a detection range. The infrared sensor is placed so that the matrix of the plurality of infrared detecting elements is inclined at a prescribed angle with respect to the prescribed direction.

19 Claims, 16 Drawing Sheets

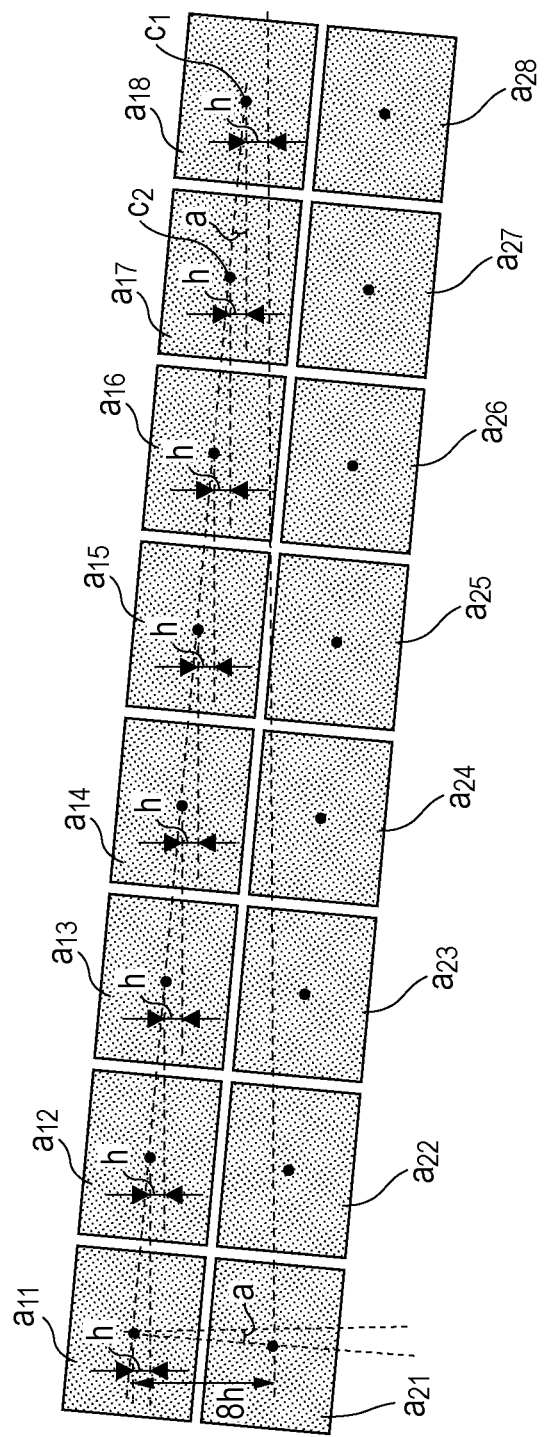

8 VERTICAL LEVELS

64 VERTICAL LEVELS

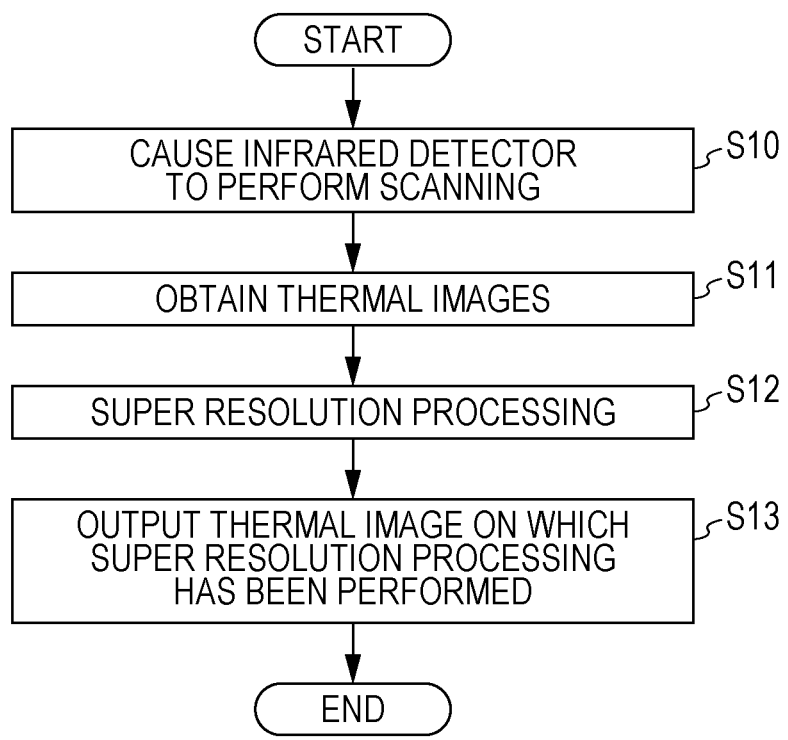

INFRARED DETECTING APPARATUS, INFRARED DETECTION METHOD, AND AIR-CONDITIONER

BACKGROUND

1. Technical Field

The present disclosure relates to an infrared detecting apparatus, an infrared detection method, and an air-conditioner that can detect infrared light.

2. Description of the Related Art

A technology that can obtain two-dimensional thermal image data at a high resolution without increasing the number of photosensitive elements in an infrared sensor is proposed (see, for example, Japanese Patent No. 5111417).

SUMMARY

In one general aspect, the techniques disclosed here feature an infrared detecting apparatus that includes an infrared sensor in which a plurality of infrared detecting elements are placed in a matrix, and a scanner that moves the infrared sensor in a prescribed direction to cause the infrared sensor to scan a detection range; the infrared sensor is placed so that the matrix of the plurality of infrared detecting elements is inclined at a prescribed angle with respect to the prescribed direction.

According to the present disclosure, it is possible to provide an infrared detecting apparatus that can improve the resolution of a thermal image without increasing the number of infrared detecting elements.

It should be noted that general or specific embodiments may be implemented as a system, a method, an integrated circuit, a computer program, a storage medium such as a computer-readable compact disc-read-only memory (CD-ROM), or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates the inclination of the infrared sensor in FIG. 3;

FIG. 6 is a flowchart illustrating the operation of the infrared detecting apparatus in the first embodiment;

DETAILED DESCRIPTION

Figure 1:
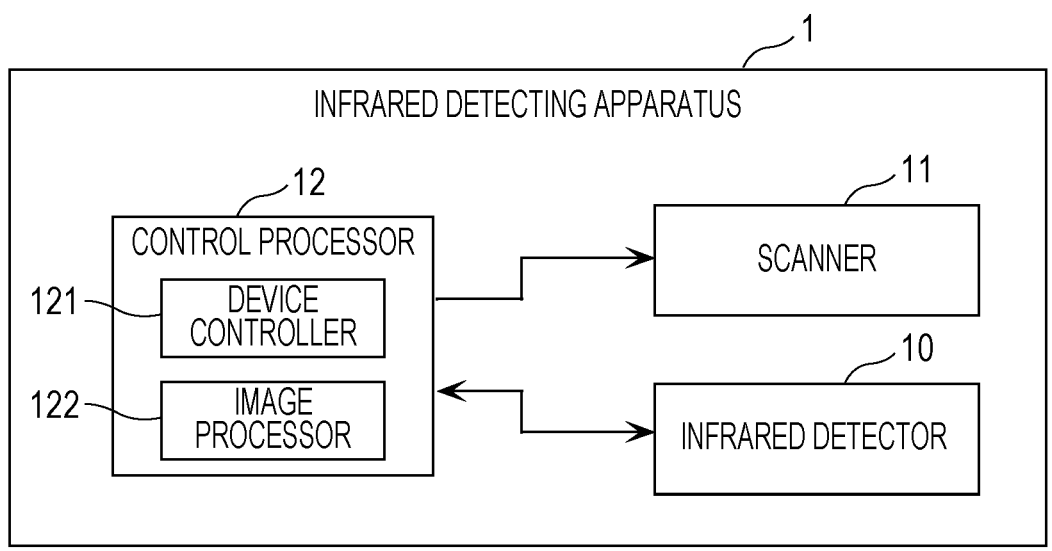
FIG. 1 illustrates an example of the structure of an infrared detecting apparatus in a first embodiment.

Underlying Knowledge Forming Basis of the Present Disclosure

An infrared sensor module is mounted in some recent air-conditioners. These air-conditioners can obtain thermal images of a temperature distribution in a room and can control the air in the room so as to make the air comfortable according to the obtained thermal images of the temperature distribution in the room.

At present, although an infrared sensor module mounted in an air-conditioner can analyze obtained thermal images, the infrared sensor module cannot analyze detailed conditions, including the positions of persons, the positions of heat sources, and thermal comfort, in the room. Therefore, a high resolution is being demanded for thermal images.

If the number of infrared detecting elements included in an infrared sensor is increased, a high-resolution thermal image can be obtained, but the cost of infrared sensor module development is increased.

A possible solution to this problem is to perform super resolution processing by, for example, performing scanning in a horizontal direction (scanning direction) at an angle smaller than the viewing angle of the infrared sensor. This enables the resolution of the thermal image to be improved in the scanning direction without increasing the number of infrared detecting elements constituting the infrared sensor. However, this is still problematic in that the resolution in the vertical direction (direction perpendicular to the scanning direction) remains the same as the resolution determined by the number of infrared detecting elements.

Japanese Patent No. 5111417, for example, discloses a method in which an infrared sensor is displaced by a predetermined amount in the vertical direction and the horizontal direction. This enables the resolution in the vertical direction to be improved without increasing the number of infrared detecting elements constituting the infrared sensor.

With the technology disclosed in Japanese Patent No. 5111417, however, scanning is performed with the infrared sensor displaced by the predetermined amount in the vertical direction and the horizontal direction, so a time taken to scan a temperature detection range (infrared detection time) is prolonged, making it hard to improve the resolution of thermal image data.

Another problem with the technology disclosed in Japanese Patent No. 5111417 is that since a motor that moves the infrared sensor in the vertical direction is thought to be mounted to displace the infrared sensor by the predetermined amount in the vertical direction, the cost of the motor is involved. Yet another problem is that since the motor that moves the infrared sensor in the vertical direction is mounted, the size of a mechanical system is increased accordingly, making it hard to mount the mechanical system in an air-conditioner or another apparatus having a limited space.

Noting the above problems, the present disclosure provides an infrared detecting apparatus that can improve the resolution of a thermal image without increasing the number of infrared detecting elements.

An infrared detecting apparatus according to an aspect of the present disclosure includes an infrared sensor in which a plurality of infrared detecting elements are placed in a matrix, and a scanner that moves the infrared sensor in a prescribed direction to cause the infrared sensor to scan a detection range; the infrared sensor is placed so that the matrix of the plurality of infrared detecting elements is inclined at a prescribed angle with respect to the prescribed direction.

Due to this structure, an infrared detecting apparatus can be implemented that can improve the resolution of a thermal image without increasing the number of infrared detecting elements.

For example, the prescribed angle may be an angle that has been adjusted so that the central positions of all of the plurality of infrared detecting elements constituting the infrared sensor are different positions when viewed from the prescribed direction.

Here, for example, the plurality of infrared detecting elements may be placed in the matrix with eight rows and eight columns, and the prescribed angle may be 7.125 degrees.

For example, in the infrared sensor, one or more of the plurality of infrared detecting elements are validated and the others are invalidated.

For example, the prescribed angle may be an angle that has been adjusted so that the central positions of the one or more of the plurality of infrared detecting elements are different positions when viewed from the prescribed direction.

For example, the prescribed angle may be an angle that has been adjusted so that the central positions of the one or more of the plurality of infrared detecting elements are spaced at equal intervals when viewed from the prescribed direction.

For example, the plurality of infrared detecting elements may be placed in a matrix with N rows and N columns (N is a natural number not smaller than 2), and the one or more of the plurality of infrared detecting elements may be a plurality of infrared detecting elements other than a plurality of infrared detecting elements placed at both ends of the matrix with N rows and N columns in the prescribed direction.

For example, the plurality of infrared detecting elements are placed in a matrix with N rows and N columns (N is a natural number not smaller than 2); and the one or more of the plurality of infrared detecting elements may include a first element string, which is a plurality of infrared detecting elements aligned along a first diagonal line, which is one of the two diagonal lines of the matrix with N rows and N columns and forms a larger angle with respect to the prescribed direction, second element strings, each of which is adjacent to the first element string and is aligned along the first diagonal line, and third element strings, each of which is adjacent to one of the second element strings and is aligned along the first diagonal line.

For example, there may be a match between a first distance in a direction perpendicular to the prescribed direction between the central position of a first element, which belongs to the first element string, and the central position of one second element, which belongs to one of the third element strings, and a distance in the direction perpendicular to the prescribed direction between the central position of the first element and the central position of another second element, which belongs to another of the third element strings, each of these second elements being included in a plurality of infrared detecting elements adjacent to a plurality of infrared detecting elements which include the first element which are aligned in a row-wise direction inclined at the prescribed angle with respect to the prescribed direction, and being adjacent to the first element in a direction perpendicular to the first diagonal line.

There may be a match between the first distance and a second distance, which is a distance in the direction perpendicular to the prescribed direction between the central position of a third element, which is one of the two second elements and which is closer to the end in the scanning direction, and the central position of a fourth element, which belongs to the second element string, the fourth element being included in a plurality of infrared detecting elements which include the first element and which are aligned in the row-wise direction, and being adjacent to the first element in the row-wise direction but not adjacent to the third element in the row-wise direction.

For example, there may be also a match between the first distance and a third distance, which is a distance in the direction perpendicular to the prescribed direction between the central position of the fourth element and the central position of a fifth element, which belongs to one of the second element strings; the fifth element is included in a plurality of infrared detecting elements which include the third element and which aligned in the row-wise direction, and being adjacent to the third element in the row-wise direction.

Here, the prescribed angle may be, for example, 33.69 degrees.

The one or more of the plurality of infrared detecting elements, for example, may further include fourth element strings, each of which is adjacent to one of the third element strings and is aligned along the first diagonal line.

The plurality of infrared detecting elements, for example, may be a plurality of infrared detecting elements placed in a matrix with N rows and N columns (N is a natural number not smaller than 2), and the one or more of the plurality of infrared detecting elements may be a plurality of infrared detecting elements placed in N rows and L columns (L is smaller than N, and L is a natural number not smaller than 2), in which the columns at both ends of the N columns are excluded.

For example, the prescribed angle may be an angle that has been adjusted so that the central positions of the one or more of the plurality of infrared detecting elements are spaced at equal intervals when viewed from the prescribed direction.

For example, the plurality of infrared detecting elements may be placed in the matrix with eight rows and eight columns; the one or more of plurality of infrared detecting elements may be a plurality of infrared detecting elements placed in the matrix with eight rows and six columns, the six columns being obtained by removing two columns at both ends of the eight columns; and the prescribed angle may be 9.462 degrees.

For example, the infrared detecting apparatus may further include a changer that can change the prescribed angle of the infrared sensor, and a control processor that controls the changer and scanner according to a detection result obtained from the infrared sensor; the control processor may cause the changer to change the prescribed angle according to a detection result obtained by controlling the scanner so that the infrared sensor scans the detection range, and may cause the infrared sensor to scan the detection range by controlling the scanner so that the infrared sensor with the prescribed angel changed moves in the prescribed direction.

An infrared detection method according to an aspect of the present disclosure includes scanning a detection range by moving an infrared sensor, in which a plurality of infrared detecting elements are placed in a matrix, in a prescribed direction to cause the infrared sensor to scan the detection range, and changing the prescribed angle of the infrared sensor; the infrared sensor is placed so that the matrix of the plurality of infrared detecting elements is inclined at the prescribed angle with respect to the prescribed direction; in the changing, the prescribed angle is changed according to a detection result obtained by causing the infrared sensor to scan the detection range in the scanning; in the scanning, if the prescribed angle is changed in the changing, the infrared sensor with the prescribed angle changed is moved in the prescribed direction so that the infrared sensor is caused to scan the detection range.

An air conditioner according an aspect of the present disclosure has an infrared detecting apparatus that includes an infrared sensor in which a plurality of infrared detecting elements are placed in a matrix, and also includes a scanner that moves the infrared sensor in a prescribed direction to cause the infrared sensor to scan a detection range; the infrared sensor is placed so that the matrix of the plurality of infrared detecting elements is inclined at a prescribed angle with respect to the prescribed direction.

It should be noted that general or specific embodiments may be implemented as a system, a method, an integrated circuit, a computer program, a storage medium such as a computer-readable compact disc-read-only memory (CD-ROM), or any selective combination thereof.

An infrared detecting apparatus and the like according to an aspect of the present disclosure will be described below with reference to the drawings.

All embodiments described below illustrate specific examples of the present disclosure. Numerals, shapes, materials, constituent elements, the placement positions of these constituent elements, and the like are only examples, and are not intended to restrict the present disclosure. Of the constituent elements in the embodiments below, constituent elements not described in independent claims, each of which indicates the topmost concept, will be described as arbitrary constituent elements.

First Embodiment

Structure of the Infrared Detecting Apparatus

The infrared detecting apparatus in the first embodiment will be described with reference to the drawings.

Figure 2A:
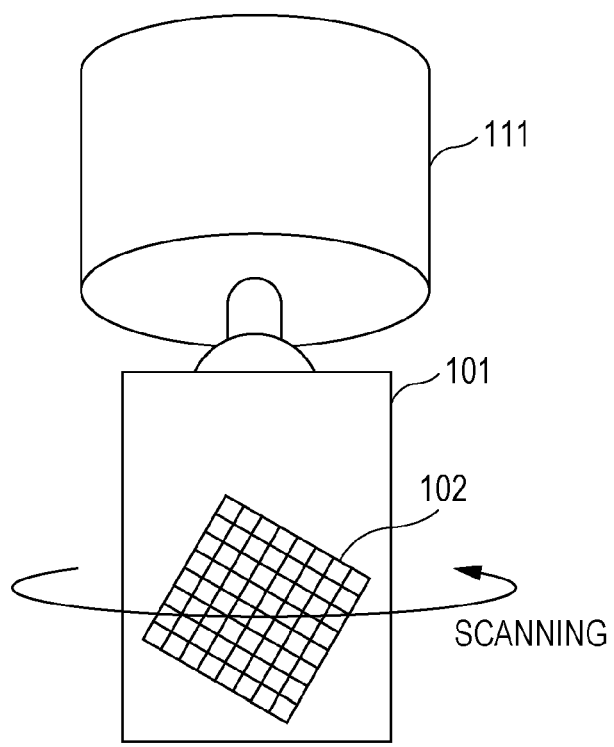
FIG. 2A is a conceptual drawing illustrating the structure of a scanner and an infrared detector in the first embodiment.

FIG. 1 illustrates an example of the structure of the infrared detecting apparatus 1 in the first embodiment. FIG. 2A is a conceptual drawing illustrating the structure of an infrared detector 10 and a scanner 11 in this embodiment.

Figure 2B:
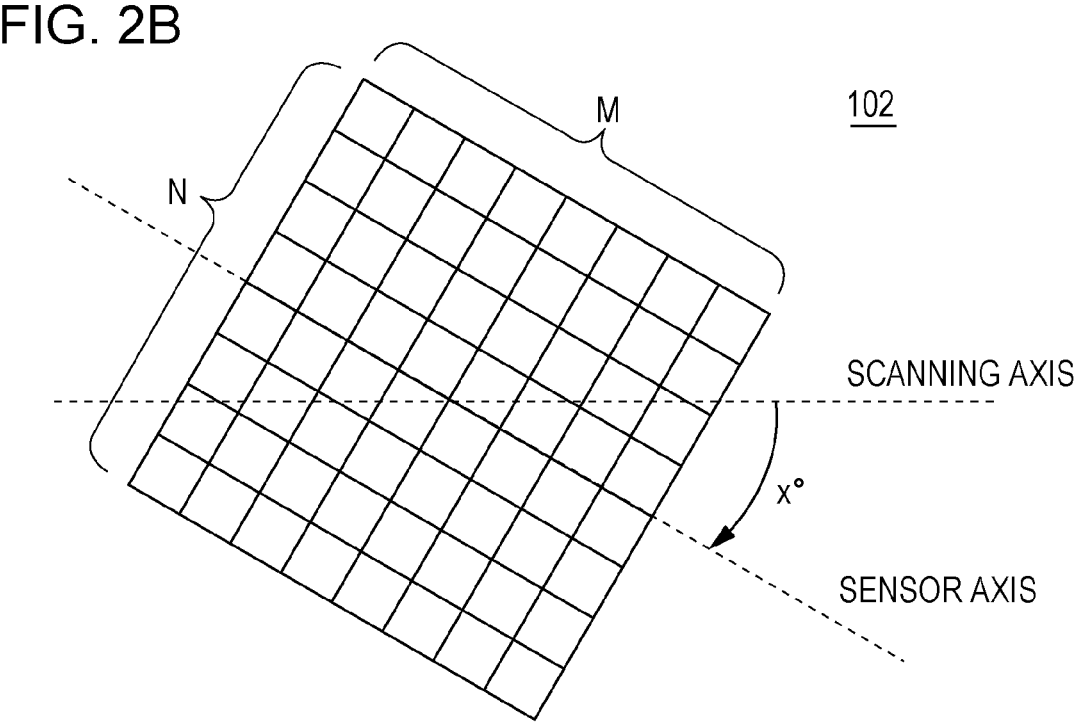
FIG. 2B is a conceptual drawing illustrating the structure of an infrared sensor in the first embodiment.

FIG. 2B is a conceptual drawing illustrating the structure of an infrared sensor 102 in this embodiment.

As illustrated in FIG. 1, the infrared detecting apparatus 1 includes the infrared detector 10, the scanner 11, and a control processor 12.

The scanner 11 causes the infrared detector 10 to perform scanning in a prescribed direction. Specifically, the scanner 11 moves the infrared sensor 102 in a prescribed direction to cause the infrared sensor 102 to scan a detection range. In this embodiment, the scanner 11 has a motor 111 illustrated in FIG. 2A. The motor 111 rotates or moves the infrared sensor 102 in a sensor module 101 in the prescribed direction under control of the control processor 12. The motor 111 is, for example, a stepping motor, a servo motor, or the like. The prescribed direction is the horizontal direction in FIG. 2A and is equivalent to the direction of the scanning axis in FIG. 2B (scanning direction).

The control processor 12 controls the scanner 11 and processes thermal images (input images) obtained by the infrared detector 10. The control processor 12 includes a device controller 121 and an image processor 122, as illustrated in FIG. 1.

The device controller 121 calculates control information, which is used to control scanning by the scanner 11, from information detected by the infrared detector 10, and controls the scanner 11 according to the calculated control information. The image processor 122 performs super resolution processing on the thermal images (input images) obtained by the infrared detector 10 and restructures the thermal images (input images) to create a highly precious thermal image (output image). The image processor 122 outputs the created highly precious thermal image, that is, the thermal image on which super resolution processing has been performed.

The thermal image is an image including a plurality of pixels that represent a temperature distribution in a temperature detection range. Super resolution processing is one type of high resolution processing by which high-resolution information (output image) that is not present in an input image can be created. Methods used in super resolution processing include a processing method by which one high-resolution image is obtained from a plurality of images and another processing method in which learning data is used. In this embodiment, when the infrared detector 10 is scanned by the scanner 11, thermal images, in the temperature detection range, that have displacements in sub-pixel units, that is, thermal image data sampled at different points, can be obtained. Therefore, the description below will assume the use of a processing method by which one high-resolution thermal image is obtained from a plurality of thermal images.

The image processor 122 may also obtain thermal image data that indicates the positions of persons present in the temperature detection range, the temperatures of the hands and face of the user, and the positions and temperatures of walls and other heat sources according to the thermal image on which super resolution processing has been performed, and may output the thermal image data.

When the infrared detector 10 is scanned by the scanner 11 in the prescribed direction, the infrared detector 10 can obtain thermal images in the temperature detection range. Specifically, the infrared detector 10 detects infrared light in the temperature detection range scanned by the infrared sensor 102, which is included in the infrared detector 10 and in which a plurality of infrared detecting elements are placed in a matrix. The infrared sensor 102 is placed so that the matrix of the plurality of infrared detecting elements is inclined at a prescribed angle with respect to the prescribed direction. The prescribed angle is an angle that has been adjusted so that the central positions of all of the plurality of infrared detecting elements constituting the infrared sensor 102 are different positions when viewed from the prescribed direction.

In this embodiment, the infrared detector 10 is structured by using, for example, the sensor module 101 illustrated in FIG. 2A. The sensor module 101 includes the infrared sensor 102 and a lens (not illustrated).

The lens is a silicon (Si) lens, a zinc sulfide (ZnS) lens, or another lens with high infrared transmittance. The lens is designed so that infrared light (infrared radiation) incident on the lens from various directions enters different infrared detecting elements constituting the infrared sensor 102.

The infrared sensor 102 includes a plurality of infrared detecting elements placed in a matrix with N rows and M columns (N and M are a natural number not smaller than 2), as illustrated in, for example, FIG. 2B. When the infrared sensor 102 is rotated (moved) along the horizontal direction, that is, the direction of the scanning axis in FIG. 2B, the infrared sensor 102 can scan the temperature detection direction. When scanning is performed in the prescribed direction (horizontal direction), the infrared detector 10 obtains thermal images (infrared light) in the temperature detection range and outputs the obtained thermal images to the image processor 122.

Specifically, the infrared sensor 102 is rotated (moved) by the motor 111 in the horizontal direction, that is, the direction of the scanning axis illustrated in FIG. 2B. Then, the infrared sensor 102 obtains thermal images (infrared light), in the temperature detection range, that have displacements in sub-pixel units, and outputs the obtained thermal images to the image processor 122.

The infrared sensor 102 is inclined at a prescribed angle (X° in FIG. 2B) with respect to the horizontal direction, that is, the direction of the scanning axis illustrated in FIG. 2B. In other words, the infrared sensor 102 includes a plurality of infrared detecting elements placed in a matrix with N rows and M columns, and the matrix of the plurality of infrared detecting elements is placed so that the matrix is parallel to and perpendicular to a sensor axis inclined at the prescribed angle (X°) with respect to the scanning axis. That is, the prescribed angle (X°) is an angle that has been adjusted so that the central positions of all of the plurality of infrared detecting elements constituting the infrared sensor 102 are different positions when viewed from the prescribed direction. In further other words, the prescribed angle (X°) is an angle that has been adjusted so that when the plurality of infrared detecting elements are rotated (moved) along the direction of the scanning axis, the M infrared detecting elements in one row in the column-wise direction parallel to the sensor axis do not coincide, in the direction of the scanning axis, with the infrared detecting elements in the adjacent row.

Since the infrared sensor 102 is inclined at the prescribed angle (X° in FIG. 2B) with respect to the direction of the scanning axis, relationships described below hold for the plurality of infrared detecting elements constituting the infrared sensor 102. That is, a distance (for example, first distance) between the central positions of each two infrared detecting elements in the same column (for example, first array) in a direction perpendicular to the scanning axis (vertical direction in FIG. 2B) is the same. A distance (for example, second distance) between an infrared detecting element (for example, first element) at one end that is at the top in the column (first array) and an infrared detecting element (for example, second element) in a column (for example, second array) adjacent to the column (first array), the infrared detecting element (second element) being adjacent to the infrared detecting element at the other end in the column (first array), in the direction perpendicular to the scanning axis (vertical direction) is the same as the first distance described above.

Thus, when a plurality of infrared detecting elements are rotated (moved) along the direction of the scanning axis, the number of infrared detecting elements in the direction perpendicular to the scanning axis exceeds N, which is the number of infrared detecting elements in a case in which the scanning axis and the sensor axis are parallel to each other. That is, when the infrared sensor 102 has a sensor axis inclined at the prescribed angle (X°) with respect to the scanning axis, the number of infrared detecting elements in the thermal image in a direction (vertical axis) perpendicular to the scanning axis can be essentially increased when compared with a case in which the scanning axis and the sensor axis are parallel to each other. This enables improvement of resolution in a direction (vertical axis) perpendicular to the scanning axis.

An example of the prescribed angle will be described through an example.

Example

Next, an example of the structure of an infrared sensor 102a in an example will be described with reference to FIGS. 3 and 4.

Figure 3:
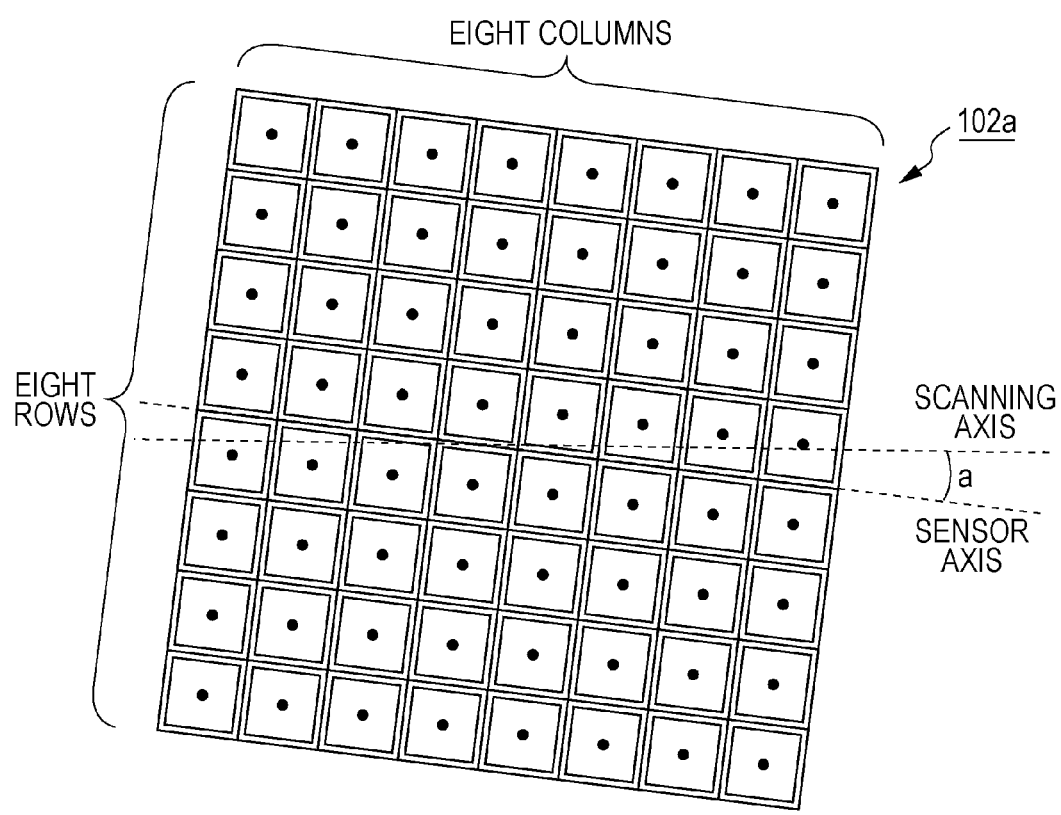
FIG. 3 illustrates an example of an infrared sensor in an example in the first embodiment.

FIG. 3 illustrates the infrared sensor 102a in the example in the first embodiment;

The infrared sensor 102a in FIG. 3, which is an example of the infrared sensor 102, includes a plurality of infrared detecting elements in a matrix with eight rows and eight columns. A detection point is indicated at the center of each infrared detecting element in FIG. 3. In each infrared detecting element, infrared detection sensitivity is high at the detection point, so infrared light may be detected at the detection point. Although each infrared detecting element detects infrared light in the entire area of the infrared detecting element, it may be assumed that the infrared detecting element dominantly detects infrared light at the detection point. The detection point may typify the area of the infrared detecting element. In this case, infrared light detected at the detection point may represent the average of the infrared light detected by the infrared detecting element.

The sensor axis of the plurality of infrared detecting elements in eight rows and eight columns, which constitute the infrared sensor 102a, is inclined at a prescribed angle "a" with respect to the horizontal direction, that is, the direction of the scanning axis illustrated in FIG. 3. The prescribed angle "a" is an example of the prescribed angle X described above. The prescribed angle "a" is an angle that has been adjusted so that the central positions of all of the infrared detecting elements placed in eight rows and eight columns are different positions when viewed from the direction of the scanning axis. That is, the prescribed angle "a" is an angle that has been adjusted so that when the plurality of infrared detecting elements placed in the 8-by-8 matrix constituting the infrared sensor 102a are rotated (moved) along the direction of the scanning axis, the eight infrared detecting elements in one row in the column-wise direction parallel to the sensor axis do not coincide, in the direction of the scanning axis, with the eight infrared detecting elements in the column-wise direction in the adjacent row.

FIG. 4 illustrates the inclination of the infrared sensor 102a illustrated in FIG. 3. For convenience of explanation, FIG. 4 illustrates a plurality of infrared detecting elements only for two rows of the plurality of infrared detecting elements placed in the matrix with eight rows and eight columns in FIG. 3. In FIG. 4, the dashed lines c1 and c2 are parallel to the scanning axis.

In FIG. 4, the prescribed angle "a" is an angle that has been adjusted so that when infrared detecting elements $a_{11}$ to $a_{18}$ and infrared detecting elements $a_{21}$ to $a_{28}$ are rotated (moved) along the direction of the scanning axis, they do not coincide, in the direction of the scanning axis, with the infrared detecting elements in the adjacent row.

Here, for example, the distance h in the vertical direction between the central positions of infrared detecting elements $a_{11}$ and $a_{12}$, the distance h in the vertical direction between the central positions of infrared detecting elements $a_{12}$ and $a_{13}$, the distance h in the vertical direction between the central positions of infrared detecting elements $a_{13}$ and $a_{14}$, the distance h in the vertical direction between the central positions of infrared detecting elements $a_{14}$ and $a_{15}$, the distance h in the vertical direction between the central positions of infrared detecting elements $a_{15}$ and $a_{16}$, the distance h in the vertical direction between the central positions of infrared detecting elements $a_{16}$ and $a_{17}$, and the distance h in the vertical direction between the central positions of infrared detecting elements $a_{17}$ and $a_{18}$ are all the same; it is a first distance. This is also true for infrared detecting elements $a_{21}$ to $a_{28}$.

The second distance, that is, the distance h in the vertical direction between the central positions of infrared detecting element $a_{18}$ (first element) and infrared detecting element $a_{21}$ (second element), is equal to the first distance. The distance in the vertical direction between the central positions of infrared detecting elements $a_{11}$ and $a_{21}$ is 8 h.

The prescribed angle "a" that satisfies the above relationships is an angle that satisfies $\tan^{-1}(1/8)$; it is calculated to be 7.125°.

Therefore, the infrared sensor 102a is structured by using 8-by-8 infrared detecting elements parallel to and perpendicular to the sensor axis, and the sensor axis is inclined at 7.125 degrees (prescribed angle "a") with respect to the scanning axis. Thus, the central positions of all of the infrared detecting elements in eight rows and eight columns, which constitute the infrared sensor 102a, are different positions when viewed from the direction of the scanning axis. As described above, the infrared detecting elements in eight columns included in the infrared sensor 102a can be placed so that each of these infrared detecting elements does not coincide, in the direction of the scanning axis, with the relevant infrared detecting element in the adjacent row, so the number of pixels in a thermal image can be essentially increased in a direction (vertical axis) perpendicular to the scanning direction.

Although, in this embodiment, infrared detecting elements in eight rows and eight columns have been described as an example of a plurality of infrared detecting elements placed in a matrix in N rows and M columns constituting the infrared sensor 102, this is not a limitation.

The plurality of infrared detecting elements may be infrared detecting elements in four rows and four columns, infrared detecting elements in 16 rows and 16 columns, or infrared detecting elements in 32 rows and 32 columns. This is because if the plurality of infrared detecting elements are infrared detecting elements in N rows and N columns (N is a natural number not smaller than 2), the cost of using an infrared sensor that can be obtained as a general-purpose product can be reduced.

Figure 5A:
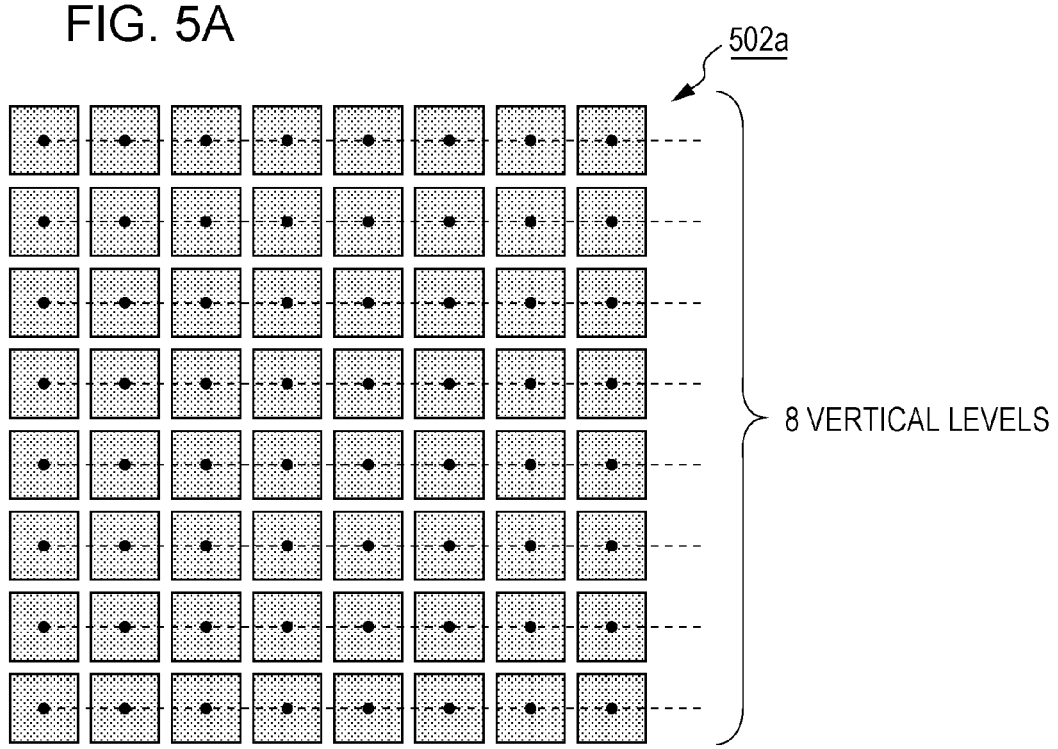
FIG. 5A illustrates an effect of the infrared detecting apparatus when an infrared sensor in a comparative example is used.
Figure 5B:
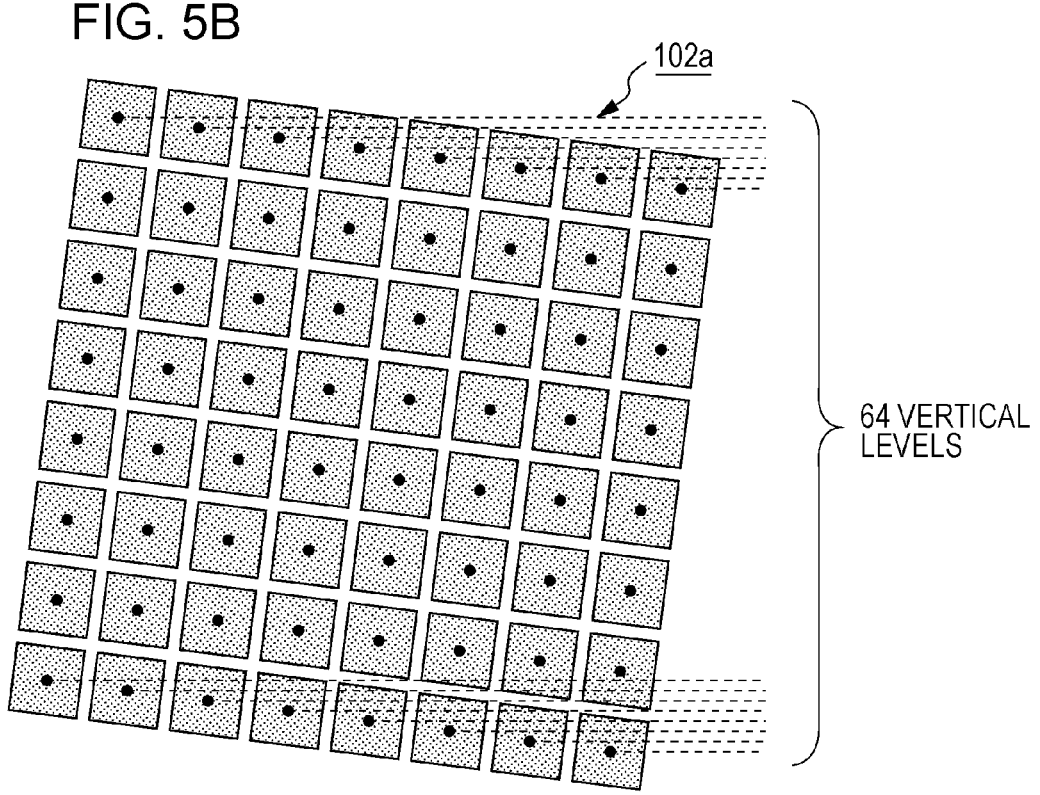
FIG. 5B illustrates an effect of the infrared detecting apparatus when the infrared sensor in FIG. 3 is used.

FIG. 5A illustrates an effect of the infrared detecting apparatus when an infrared sensor 502a in a comparative example is used. FIG. 5B illustrates an effect of the infrared sensor 102a illustrated in FIG. 3 is used;

The infrared sensor 502a, illustrated in FIG. 5A, in the comparative example is not inclined with respect to the direction of the scanning axis (horizontal direction). That is, the sensor axis of the infrared sensor 502a matches the scanning axis. In this case, when the 8-by-8 infrared detecting elements constituting the infrared sensor 502a are rotated (moved) along the direction of the scanning axis, these infrared detecting elements in a direction (column-wise direction) parallel to the scanning axis coincide with the relevant adjacent infrared detecting elements in the adjacent row. Therefore, the number of infrared detecting elements in the direction perpendicular to the scanning axis remains to be eight.

By contrast, the infrared sensor 102a illustrated in FIG. 5B is inclined at 7.125 degrees with respect to the direction of the scanning axis (horizontal direction). That is, the sensor axis of the infrared sensor 102a is inclined at 7.125 degrees with respect to the scanning axis. In this case, when the 8-by-8 infrared detecting elements constituting the infrared sensor 102a are rotated (moved) along the direction of the scanning axis, the infrared detecting elements in a direction (column-wise direction) parallel to the scanning axis do not coincide with the relevant adjacent infrared detecting elements in the adjacent row. Therefore, the number of infrared detecting elements in the direction perpendicular to the scanning axis is increased from eight (eight vertical levels), which is the number of infrared detecting elements in the infrared sensor 102a in the row-wise direction, to 64 (64 vertical levels).

Since the infrared detecting apparatus 1 has the infrared sensor 102a structured by using infrared detecting elements that have a sensor axis inclined at 7.125 degrees with respect to the scanning axis, the infrared detecting apparatus 1 can obtain thermal images with high resolution, which is by a factor of eight when compared with the comparative example, without increasing the number of infrared detecting elements constituting the infrared sensor 102a. In addition, when super resolution processing is performed on these thermal images in the control processor 12, the infrared detecting apparatus 1 can obtain a thermal image with more improved resolution.

Operation of the Infrared Detecting Apparatus

Next, the operation of the infrared detecting apparatus 1 structured as described above will be described.

FIG. 6 is a flowchart illustrating the operation of the infrared detecting apparatus 1 in the first embodiment.

First, the infrared detecting apparatus 1 causes the infrared detector 10 to perform scanning (S10) to obtain thermal images in a temperature detection range (S11). Specifically, the infrared detecting apparatus 1 moves (rotates) the infrared sensor 102a included in the infrared detector 10 along the scanning axis so that the infrared sensor 102a scans the temperature detection range and obtains thermal images in the temperature detection range. The infrared sensor 102a performs scanning by being moved (rotated) by the scanner 11 one sub-pixel at a time, and obtains a plurality of thermal images in which sub-pixels have been moved one at a time.

Next, the infrared detecting apparatus 1 performs super resolution processing on the obtained thermal images (S12). Specifically, the infrared detecting apparatus 1 performs processing on the plurality of obtained thermal images and restructures the plurality of thermal images to create a single highly precise thermal image.

Next, the infrared detecting apparatus 1 outputs the created highly precise thermal image, that is, the thermal image on which super resolution processing has been performed (S13).

Thus, the infrared detecting apparatus 1 can obtain a high-resolution thermal image in the temperature detection range.

Effects and the Like in the First Embodiment

As described above, the infrared detecting apparatus in this embodiment includes an infrared sensor structured by using infrared detecting elements that have a sensor axis inclined at a prescribed angle with respect to the scanning axis. Thus, it is possible to improve the resolution of a thermal image without increasing the number of infrared detecting elements constituting the infrared sensor. The prescribed angle is an angle that has been adjusted so that the central positions of a plurality of infrared detecting elements constituting the infrared sensor are all different positions when viewed from a prescribed direction, which matches the scanning direction. If, for example, the infrared sensor is structured by using infrared detecting elements in eight rows and eight columns, the prescribed angle is 7.125 degrees.

In addition, since the infrared detecting apparatus in this embodiment can obtain thermal images with high resolution without increasing the number of infrared detecting elements constituting the infrared sensor, there is no need to add a motor to move the infrared sensor (to cause the infrared sensor to perform scanning) in a direction as well that is perpendicular to the scanning axis. Since the infrared detecting apparatus in this embodiment can obtain thermal images with high resolution without increasing the number of infrared detecting elements constituting the infrared sensor, there is also no need to use an infrared sensor that is expensive because of having more infrared detecting elements. That is, the infrared detecting apparatus in this embodiment not only can eliminate the cost of a motor, which would otherwise need to be used to obtain thermal images with high resolution, but also can eliminate the cost of using an infrared sensor having more infrared detecting elements.

With the infrared detecting apparatus in the comparative example, a motor is added to add a direction in which the infrared sensor performs scanning and thereby to enable a thermal image with high resolution to be obtained. Therefore, the mechanical size of the infrared detecting apparatus in the comparative example is enlarged in correspondence to the addition of the motor. This makes it difficult to mount the infrared detecting apparatus in the comparative example in another apparatus, such as, for example, an air conditioner, as a module. By contrast, with the infrared detecting apparatus in this embodiment, there is no need to add a motor to add a scanning direction (scanning in the direction perpendicular to the scanning axis), so the size of the infrared detecting apparatus is not enlarged. A resulting effect is that the infrared detecting apparatus in this embodiment can be easily mounted in another apparatus, such as, for example, an air conditioner, as a module.

When compared with a case in which a motor is added to move the infrared sensor (to cause the infrared sensor to perform scanning) in the direction perpendicular to the scanning axis as well, after the scanning in the direction of the scanning axis, the infrared detecting apparatus in this embodiment does not also need a time for additional scanning in the direction perpendicular to the scanning axis. That is, the infrared detecting apparatus in this embodiment also has the effect that the resolution of a thermal image can be improved without prolonging an infrared detection time.

This effect will be specifically described below. As described above, with the infrared detecting apparatus in the comparative example, a motor is added to add a direction in which the infrared sensor performs scanning and thereby to enable a thermal image with high resolution to be obtained, so a scanning time (infrared detection time) to obtain a thermal image is prolonged in correspondence to the addition of the scanning direction. That is, since the infrared detecting apparatus in the comparative example takes a time to obtain a thermal image in the temperature detection range, a time from when scanning starts until a thermal image is obtained is long. This is problematic in that the resolution of the obtained thermal image is lower than an expected resolution. With the infrared detecting apparatus in this embodiment, however, there is no need to add a motor to add a scanning direction (scanning in the direction perpendicular to the scanning axis), so the resolution of a thermal image can be improved without prolonging an infrared detection time.

Modifications

In the first embodiment, a case in which a plurality of infrared detecting elements constituting the infrared sensor are all effective (a plurality of infrared detecting elements constituting the infrared sensor are all used) has been described. However, this is not a limitation. In view of the adverse effects of the coma aberration and spherical aberration caused by a lens used in the infrared sensor to focus infrared light, only part of a plurality of infrared detecting elements constituting the infrared sensor may be validated and other infrared detecting elements, other than the part of the plurality of infrared detecting elements, may be invalidated.

An example in the above case will be described below as a modification.

Spherical aberration is a type of aberration that occurs due to the lens surface being spherical. That is, spherical aberration occurs because the lens surface is spherical, so a difference is caused in the progress of light between the central portion of the lens and its periphery. Coma aberration is a phenomenon in which a point image has a tail at a place distant from the optic axis, that is, a phenomenon in which light exiting from a point distant from the optic axis forms an image having a tail such as, for example, a comet without focusing at a single point on an image surface, and the point image is extended.

Structure of the Infrared Sensor

Figure 7:
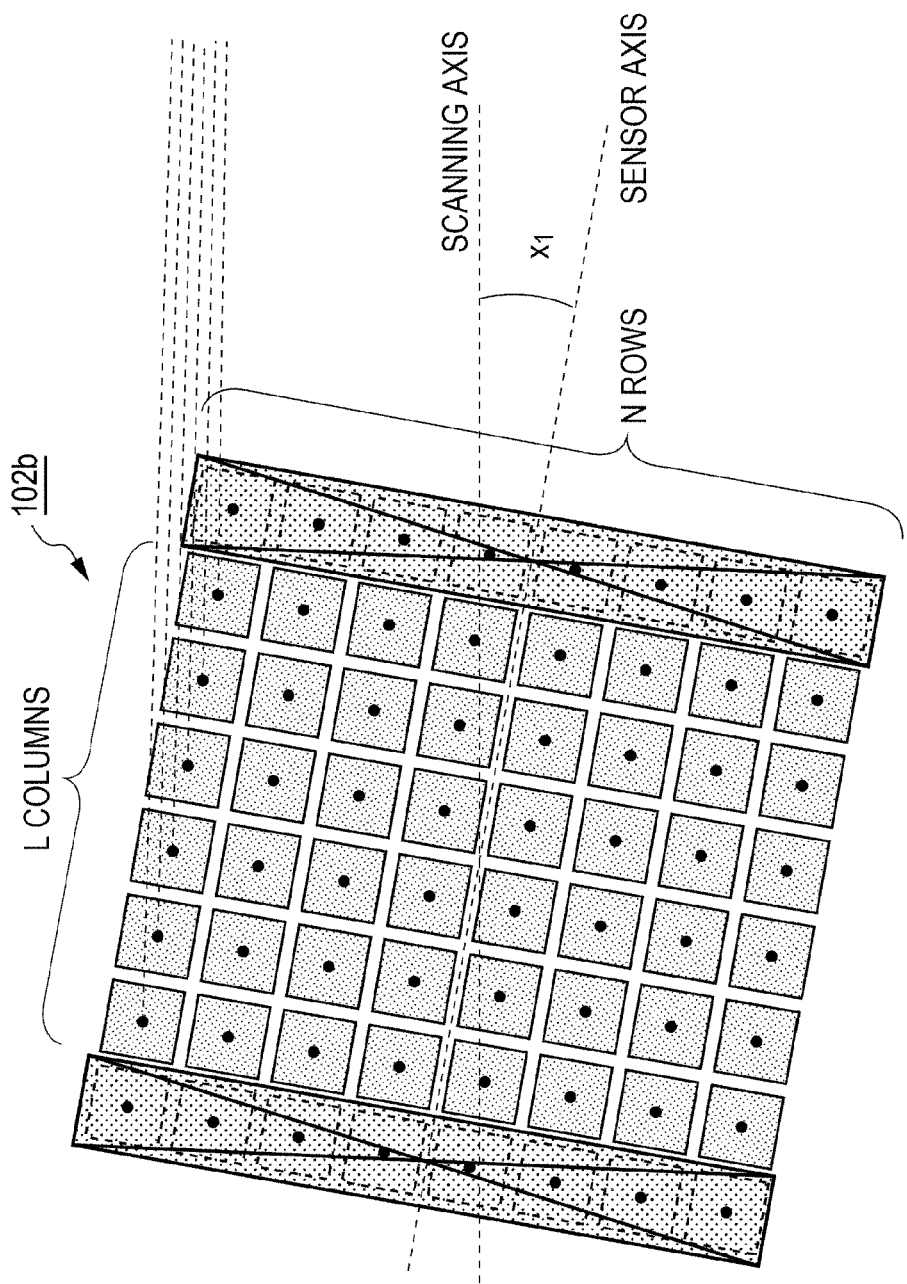
FIG. 7 is a conceptual drawing illustrating the structure of an infrared sensor in a modification of the first embodiment.

FIG. 7 is a conceptual drawing illustrating the structure of an infrared sensor 102b in the modification of the first embodiment.

The infrared sensor 102b is an example of the infrared sensor 102. A plurality of infrared detecting elements constituting the infrared sensor 102b are placed in a matrix with N rows and N columns (N is a natural number not smaller than 2). Infrared detecting elements in the columns at both ends of the N columns are invalidated. That is, the infrared sensor 102b uses only part of the N-by-N infrared detecting elements, the part including infrared detecting elements in N rows and L columns (L is smaller than N, and L is a natural number not smaller than 2), in which the columns at both ends of the N columns are excluded. The reason why the columns at both ends of the N columns are excluded is that the lens used in the infrared sensor 102b causes larger adverse effects of coma aberration and spherical aberration on infrared detecting elements in the infrared sensor 102b at positions more distant from the center of the infrared sensor 102b.

The infrared sensor 102b is inclined at a prescribed angle ($X_1°$ in FIG. 7) with respect to the direction of the scanning axis, as in the first embodiment. The prescribed angle $X_1$ is an angle that has been adjusted so that the central positions of all of the infrared detecting elements in N rows and N columns constituting the infrared sensor 102b are different positions when viewed from the direction of the scanning axis. If, for example, the infrared sensor 102b is structured by using a plurality of infrared detecting elements in eight rows and eight columns and infrared detecting elements only in eight rows and six columns are used as part of the plurality of infrared detecting elements, the prescribed angle $X_1$ is 9.462 degrees.

The prescribed angle may have been adjusted so that the central positions of all of the part of the infrared detecting elements in N rows and L columns, instead of all of the infrared detecting elements in N rows and N columns constituting the infrared sensor 102b, are different positions when viewed from the direction of the scanning axis.

In this case, the central positions of the part (N rows and L columns) of the infrared detecting elements are spaced at equal intervals when viewed from the direction of the scanning axis.

The prescribed angle preferably satisfies an expression, $X_1 = \arctan(1/C_{\mathit{eff}})$, where $X_1$ is the prescribed angle and $C_{\mathit{eff}}$ is the number of columns including pixels in use. When the expression is applied to FIG. 7, $C_{\mathit{eff}}$ is 6. When the expression is applied to FIG. 8, which will be referenced later, $C_{\mathit{eff}}$ is also 6.

Effects and the Like in the Modification

As described above, with the infrared detecting apparatus in this modification, it is possible to improve the resolution of a thermal image without increasing the number of infrared detecting elements constituting the infrared sensor. In addition, in this modification, only part of a plurality of infrared detecting elements constituting the infrared sensor is used instead of using all of the plurality of infrared detecting elements. Thus, the adverse effects of the coma aberration and spherical aberration caused by a lens used in the infrared sensor to focus infrared light can be reduced.

In this modification, a case in which infrared detecting elements in the columns at both ends in the direction of the scanning axis are invalidated so as not to be used has been described as an example of using only part of a plurality of infrared detecting elements constituting the infrared sensor. However, this is not a limitation. For example, part of the infrared detecting elements in the columns at both ends in the direction of the scanning axis may be validated, as illustrated in FIG. 8.

Figure 8:
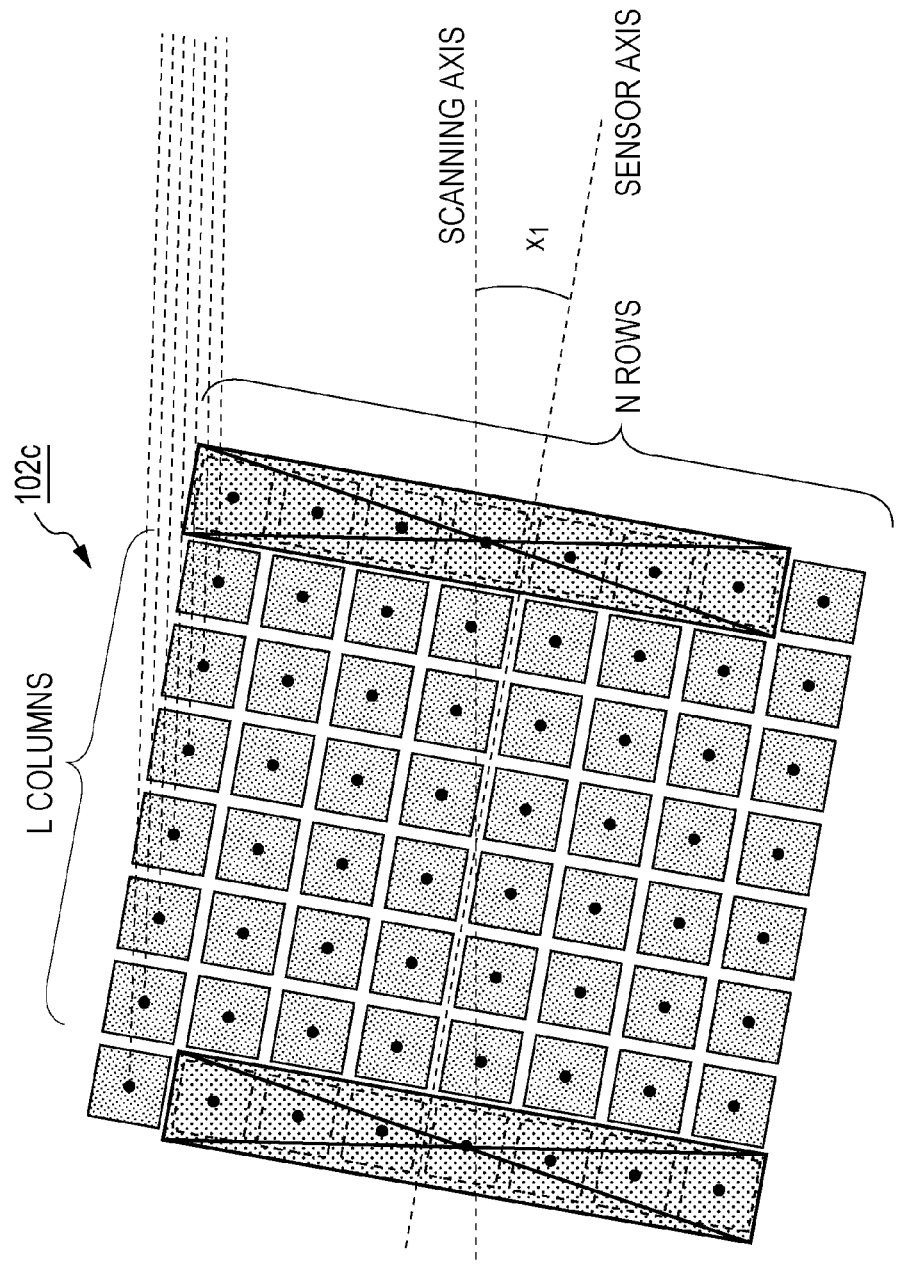
FIG. 8 is a conceptual drawing illustrating the structure of an infrared sensor in another modification of the first embodiment.

FIG. 8 is a conceptual drawing illustrating the structure of an infrared sensor in another modification of the first embodiment. Elements that are the same as in FIG. 7 will be given the same reference characters and their detailed descriptions will be omitted.

The infrared sensor 102c illustrated in FIG. 8 is an example of the infrared sensor 102. The infrared sensor 102c includes a plurality of infrared detecting elements in a matrix with N rows and N columns (N is a natural number not smaller than 2).

In the infrared sensor 102c, infrared detecting elements in the columns at both ends of the N columns, excluding part of the infrared detecting elements at both ends, have been invalidated. Specifically, as illustrated in FIG. 8, the infrared sensor 102b uses infrared detecting elements in N rows and L columns (L is smaller than N, and L is a natural number not smaller than 2), in which the columns at both ends of the N columns are excluded, and also uses the infrared detecting element at the bottom of the column at the right end in FIG. 8 (the right end is the end on the front side, in the course of scanning, of the two sides) and the infrared detecting element at the top of the column at the left end in FIG. 8 (the left end is the end on the back side, in the course of scanning, of the two sides). The reason why the columns at both ends of the N columns are excluded is due to large adverse effects of coma aberration and spherical aberration as described above. A reason why part of the infrared detecting elements at both ends of the N columns is validated is to increase the number of infrared detecting elements in the direction (vertical axis) perpendicular to the scanning axis to improve the number of pixels in the thermal image in the direction (vertical axis) perpendicular to the scanning axis so that the field of vision is expanded. Another reason is that the part of the infrared detecting elements is at positions at which the adverse effects of the lens are also reduced.

Second Embodiment

An example of validating only part of all of the infrared detecting elements constituting an infrared sensor is not limited to the examples described above. In this embodiment, another layout of partial infrared detecting elements to be validated will be described. The following description will focus on differences from the first embodiment.

Structure of the Infrared Sensor

Figure 9:
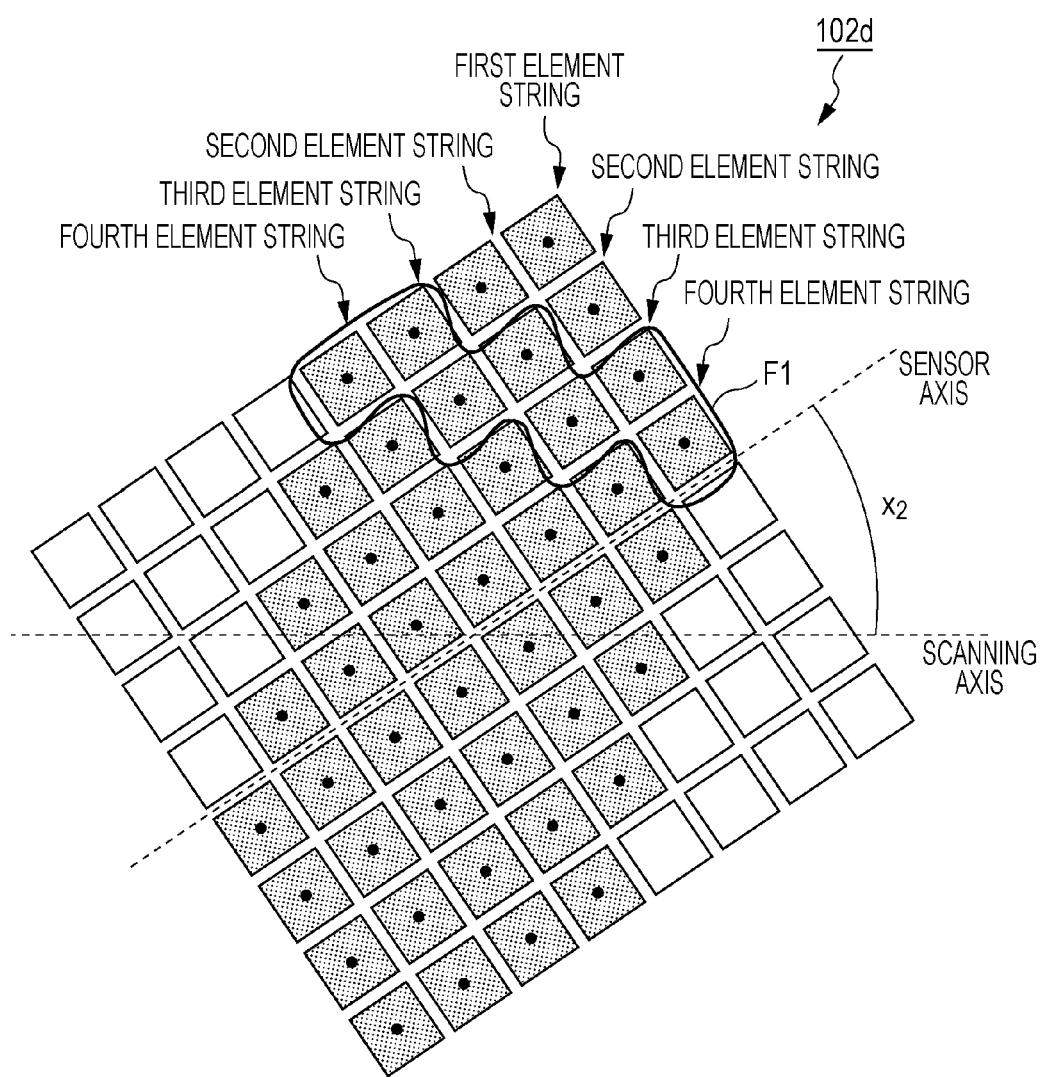
FIG. 9 is a conceptual drawing illustrating the structure of an example of an infrared sensor in a second embodiment.
Figure 10:
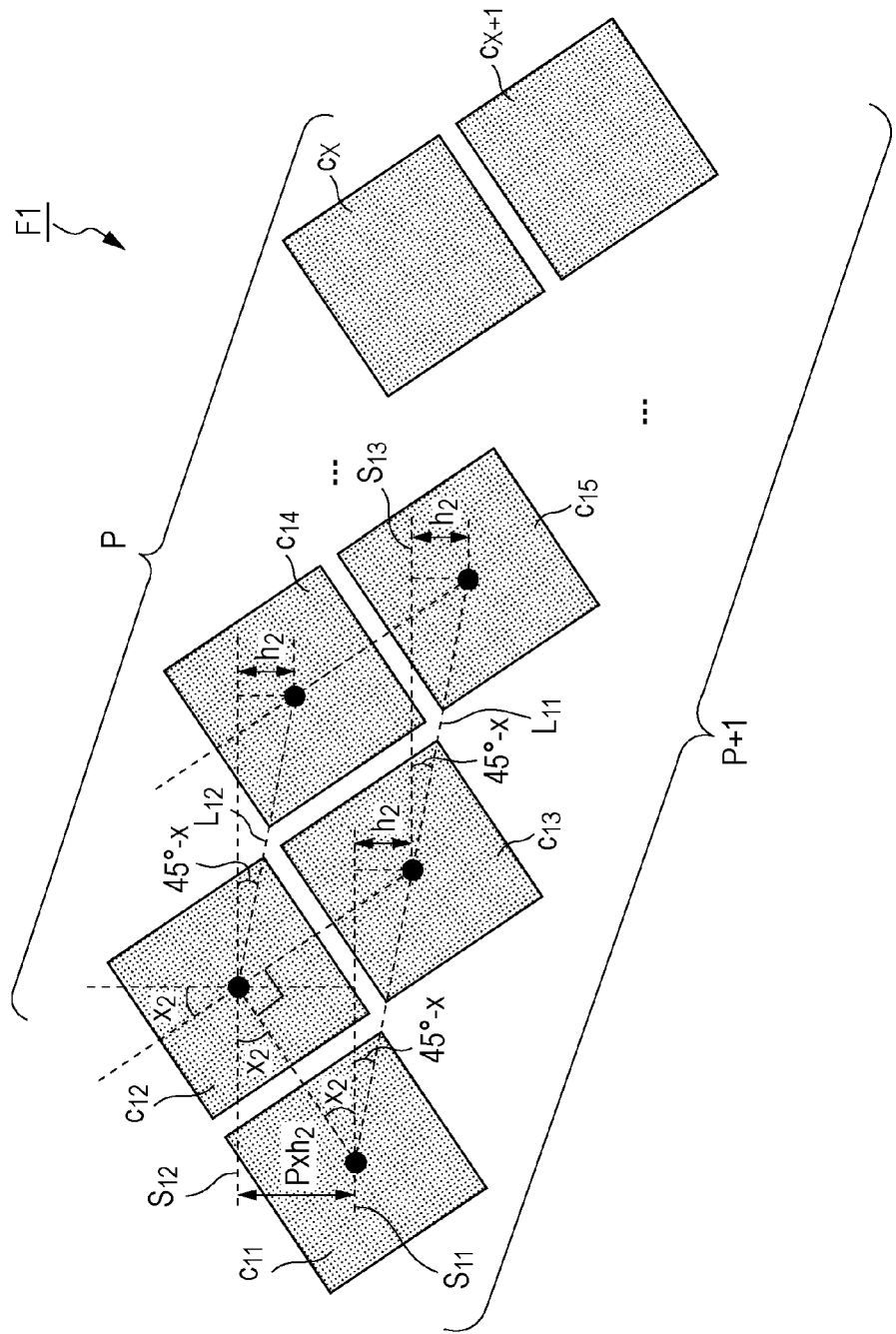
FIG. 10 illustrates the inclination of the infrared sensor in FIG. 9.

FIG. 9 is a conceptual drawing illustrating the structure of an example of an infrared sensor in a second embodiment. FIG. 10 illustrates the inclination of the infrared sensor in FIG. 9.

The infrared sensor 102d is an example of the infrared sensor 102. Only part of a plurality of infrared detecting elements constituting the infrared sensor 102d has been validated, and other infrared detecting elements, other than the part of the plurality of infrared detecting elements, have been invalidated.

In this embodiment, the plurality of infrared detecting elements constituting the infrared sensor 102d are placed in a matrix with N rows and N columns (N is a natural number not smaller than 2). The part of the infrared detecting elements in N rows and N columns is a plurality of infrared detecting elements other than a plurality of infrared detecting elements at both ends in the direction of the scanning axis.

Specifically, the part of the infrared detecting elements illustrated in FIG. 9 includes a first element string, which is a plurality of infrared detecting elements aligned along a first diagonal line, which is one of the two diagonal lines of the matrix with N rows and N columns and forms a larger angle with respect to the direction of the scanning axis, second element strings, each of which is adjacent to the first element string and are aligned along the first diagonal line, third element strings, each of which is adjacent to one of the second element strings and is aligned along the first diagonal line, and fourth element strings, each of which is adjacent to one of the third element strings and is aligned along the first diagonal line. That is, of the plurality of infrared detecting elements constituting the infrared sensor 102d, the infrared detecting elements in the first element string, second element strings, third element strings, and fourth element strings have been validated as part of the infrared detecting elements, and the other infrared detecting elements have been invalidated.

The infrared sensor 102d is inclined at a prescribed angle ($x_2$° in FIG. 9) with respect to the direction of the scanning axis, as in the first embodiment. The prescribed angle $x_2$ is an angle that has been adjusted so that the central positions of all of the part of the infrared detecting elements described above are different positions when viewed from the direction of the scanning axis.

Now, a method of calculating the prescribed angle $x_2$ will be described with reference to, for example, FIG. 10, in which a partial area F1 illustrated in FIG. 9 is magnified. In FIG. 10, the dashed lines S11, S12, and 13 are parallel to the scanning axis. The dashed line L11, which is parallel to the scanning axis, mutually connects infrared detecting elements $c_{11}$, $c_{13}$, and $c_{15}$. Similarly, the dashed line L12, which is parallel to the scanning axis, mutually connects infrared detecting elements $c_{12}$ and $c_{14}$. Also, each of the dashed line L11 and L12 is perpendicular to the first diagonal line. That is, each of the dashed line L11 and L12 is parallel to a second diagonal line, which is one of the two diagonal lines of the matrix with N rows and N columns and forms a smaller angle with respect to the direction of the scanning axis. The infrared detecting elements $c_{11}$, $c_{13}$, and $c_{15}$ are aligned along a direction parallel to the second diagonal line. The infrared detecting elements $c_{12}$ and $c_{14}$ are aligned along the direction parallel to second diagonal line.

Here, for example, the distance $h_2$ in the direction perpendicular to the scanning axis (vertical direction in FIG. 10) between the central positions of infrared detecting elements $c_{11}$ and $c_{13}$, the distance $h_2$ in the direction perpendicular to the scanning axis (vertical direction in FIG. 10) between the central positions of infrared detecting elements $c_{13}$ and $c_{15}$, and the distance $h_2$ in the direction perpendicular to the scanning axis (vertical direction in FIG. 10) between the central positions of infrared detecting elements $c_{12}$ and $c_{14}$ are all the same. The distance in the direction perpendicular to the scanning axis (vertical direction in FIG. 10) between, for example, the central positions of infrared detecting elements $c_{11}$ and $c_{12}$ is $h_2$ times P (that is, $P \times h_2$), which is one less than the number of element strings.

When an angle $x_2$ that satisfies the above relationships is calculated, the prescribed angle $x_2$ can be obtained. Specifically, these relationships are represented as relational expressions, $\sin(x_2) = Ph_2/D_1$ and $\sin(45-x_2) = h_2/(\sqrt{2} \times D_1)$, where $D_1$ is a distance between infrared detecting elements, which is, for example, the distance between the central positions of infrared detecting elements $c_{11}$ and $c_{12}$ (distance on the scanning axis). When these relational expressions are solved, the prescribed angle $x_2$ can be calculated. Specifically, when the above relational expressions are solved to be $\sin(x_2) = P\sqrt{2} \times \sin(45-x_2)$, that is, $\sin(x_2) = P \cos(x_2) - P \sin(x_2)$, and then rewritten as $\tan(x_2) = P/(P+1)$, the prescribed angle $x_2$ is calculated to be $\tan^{-1} P/(P+1)$.

An example of the prescribed angle will be described below by using an example.

EXAMPLE

The structure of an infrared sensor 102e in this embodiment will be described with reference to FIGS. 11 and 12.

Figure 11:
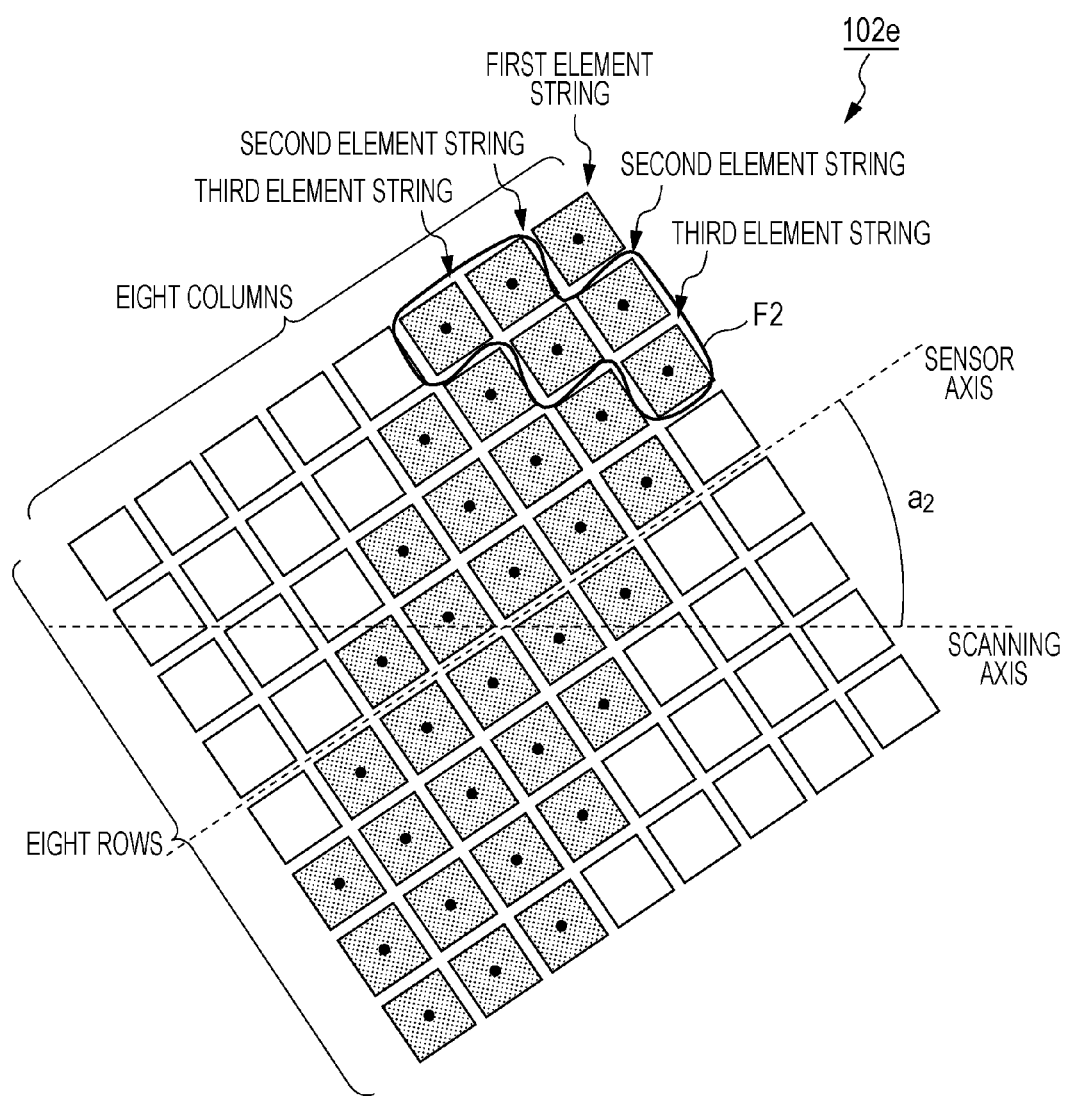
FIG. 11 is a conceptual drawing illustrating the structure of an infrared sensor in an example in the second embodiment.

FIG. 11 is a conceptual drawing illustrating the structure of an infrared sensor in an example in the second embodiment. FIG. 12 illustrates the inclination of the infrared sensor in FIG. 11.

The infrared sensor 102e in FIG. 10, which is an example of the infrared sensor 102, includes a plurality of infrared detecting elements in a matrix with eight rows and eight columns. With the infrared sensor 102e, only part of the plurality of infrared detecting elements has been validated and the other of the plurality of infrared detecting elements, other than the part of the plurality of infrared detecting elements, have been invalidated.

In this embodiment, the plurality of infrared detecting elements constituting the infrared sensor 102e are placed in a matrix with eight rows and eight columns. The part of the plurality of infrared detecting elements is a plurality of infrared detecting elements other than a plurality of infrared detecting elements at both ends of the eight rows and eight columns in the direction of the scanning axis.

Specifically, the part of the infrared detecting elements illustrated in FIG. 11 includes a first element string, which is a plurality of infrared detecting elements aligned along a first diagonal line, which is one of the two diagonal lines of the matrix with eight rows and eight columns and forms a larger angle with respect to the direction of the scanning axis, second element strings, which are adjacent to the first element string and are aligned along the first diagonal line, and third element strings, which are adjacent to the second element strings and are aligned along the first diagonal line. That is, of the plurality of infrared detecting elements constituting the infrared sensor 102e, infrared detecting elements in the first element string, second element strings, and third element strings have been validated as part of the infrared detecting elements, and the other infrared detecting elements have been invalidated.

The infrared sensor 102e is inclined at a prescribed angle ($a_2$° in FIG. 11) with respect to the direction of the scanning axis. The prescribed angle $a_2$ has been adjusted so that the central positions of all of the part of the infrared detecting elements described above are different positions when viewed from the direction of the scanning axis.

Now, a method of calculating the prescribed angle $a_2$ will be described with reference to, for example, FIG. 12, in which a partial area F2 illustrated in FIG. 11 is magnified. In FIG. 12, the dashed lines S21, S22, and S23 are parallel to the scanning axis. The dashed line L21, which is parallel to the scanning axis, mutually connects infrared detecting elements $c_{21}$, $c_{23}$, and $c_{25}$. Similarly, the dashed line L22, which is parallel to the scanning axis, mutually connects infrared detecting elements $c_{22}$ and $c_{24}$. Also, each of the dashed line L11 and L12 is perpendicular to the first diagonal line. That is, each of the dashed line L11 and L12 is parallel to the second diagonal line. The infrared detecting elements $c_{11}$, $c_{13}$, and $c_{15}$ are aligned along a direction parallel to the second diagonal line. The infrared detecting elements $c_{12}$ and $c_{14}$ are aligned along the direction parallel to second diagonal line.

There is a match between the distance in a direction perpendicular to the direction of the scanning axis between the central position of a first element (infrared detecting element $c_{23}$), which belongs to the first element string, and the central position of a second element (infrared detecting element $c_{21}$), which belongs to one of the third element strings, and the distance in a direction perpendicular to the direction of the scanning axis between the central position of the first element (infrared detecting element $c_{23}$) and the central position of another second element (infrared detecting element $c_{25}$), which belongs to another of the third element strings. These distances are referred to as the first distance. Each of these second elements (infrared detecting elements $c_{21}$ and $c_{25}$) is included in a plurality of infrared detecting elements adjacent to a plurality of infrared detecting elements that include the first element (infrared detecting element $c_{23}$) and are aligned in the row-wise direction inclined at the prescribed angle with respect to the direction of the scanning axis, and is adjacent to the first element (infrared detecting element $c_{23}$) in a direction perpendicular to the first diagonal line. There is also a match between the first distance and a second distance. The second distance is the distance in a direction perpendicular to the direction of the scanning axis between the central position of a third element (infrared detecting element $c_{21}$), which is one of the two second elements (infrared detecting elements $c_{21}$ and $c_{25}$) and which is closer to the end in the scanning direction, and the central position of a fourth element (infrared detecting element $c_{24}$), which belongs to the second element string; the fourth element (infrared detecting element $c_{24}$) is included in a plurality of infrared detecting elements that include the first element (infrared detecting element $c_{23}$) and are aligned in the row-wise direction, and is adjacent to the first element (infrared detecting element $c_{23}$) in the row-wise direction but not adjacent to the third element (infrared detecting element $c_{21}$) in the row-wise direction. There is also a match between the first distance and a third distance. The third distance is the distance in a direction perpendicular to the direction of the scanning axis between the central position of the fourth element (infrared detecting element $c_{24}$) and
the central position of a fifth element (infrared detecting element $c_{22}$), which belongs to the second element string; the fifth element (infrared detecting element $c_{22}$) is included in a plurality of infrared detecting elements that include the third element (infrared detecting element $c_{21}$) and are aligned in the row-wise direction, and is adjacent to the third element (infrared detecting element $c_{21}$).

Figure 12:
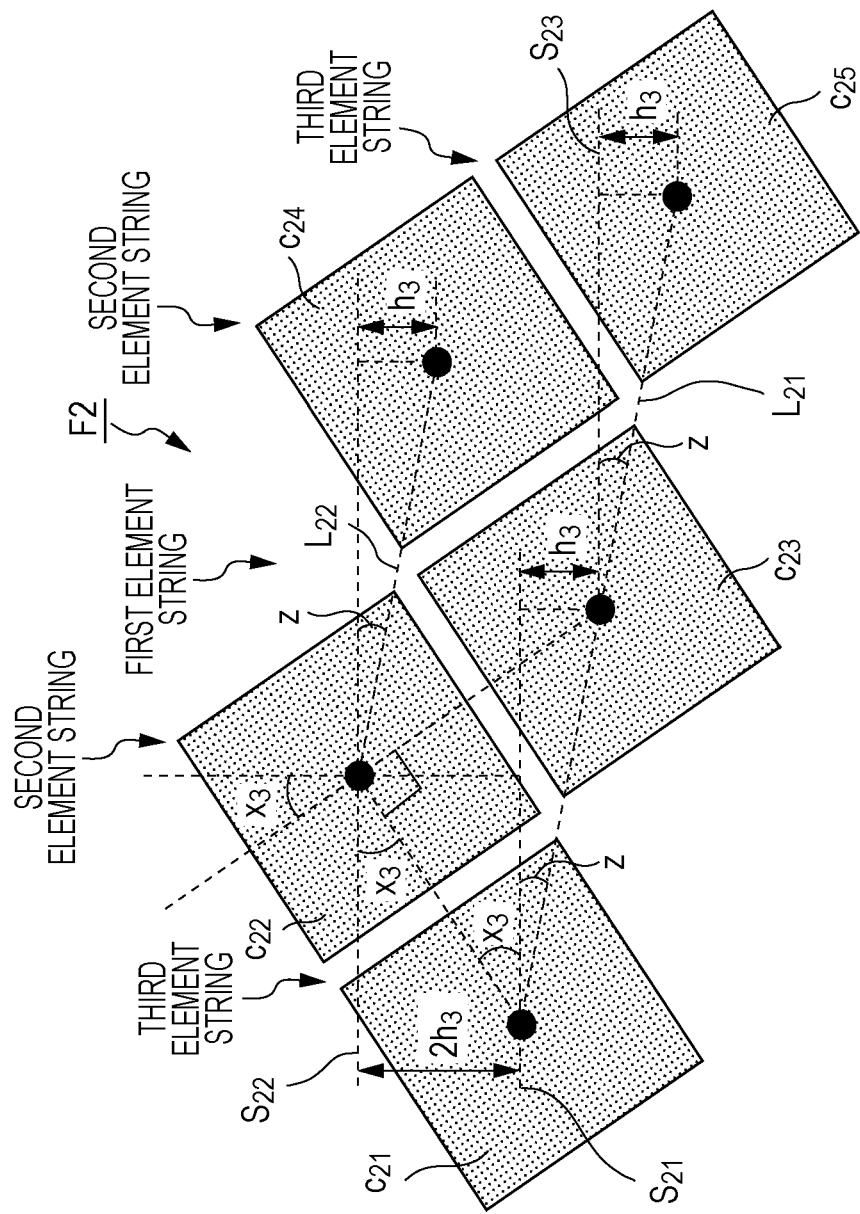
FIG. 12 illustrates the inclination of the infrared sensor in FIG. 11.

Specifically, as illustrated in FIG. 12, for example, the distance $h_3$ in a direction perpendicular to the direction of the scanning axis (vertical direction in the drawing) between the central position of infrared detecting element $c_{21}$ and the central position of infrared detecting element $c_{23}$, the distance $h_3$ in a direction perpendicular to the direction of the scanning axis (vertical direction in the drawing) between the central position of infrared detecting element $c_{23}$ and the central position of infrared detecting element $c_{25}$, and the distance $h_3$ in a direction perpendicular to the direction of the scanning axis (vertical direction in the drawing) between the central position of infrared detecting element $c_{22}$ and the central position of infrared detecting element $c_{24}$ are all the same. The distance in a direction perpendicular to the direction of the scanning axis (vertical direction in the drawing), for example, between the central position of infrared detecting element $c_{21}$ and the central position of infrared detecting element $c_{22}$ is twice $h_3$ ((number of element strings−1)×$h_3$).

When an angle $x_3$ that satisfies the above relationships is calculated, the prescribed angle $a_2$ can be obtained. Specifically, these relationships are represented as relational expressions, $\sin(x_3)=2h_3/D_2$, $\sin(z)=h_3/(\sqrt{2}\times D_2)$, and $z=45-x_3$, where $D_2$ is a distance between infrared detecting elements, which is, for example, the distance between the central positions of infrared detecting elements $c_{21}$ and $c_{22}$ (distance on the sensor axis). When these relational expressions are solved, the prescribed angle $a_2$ can be calculated. Specifically, when the above relational expressions are solved to be $\sin(x_3)=2\sqrt{2}\times\sin(z)$, that is, $\sin(x_3)=2\cos(x_3)-2\sin(x_3)$, and then rewritten as $\tan(x_3)=\frac{2}{3}$, the prescribed angle $x_3$ can be solved to be 33.69 degrees. Thus, the prescribed angle $a_2$ can be calculated to be 33.69 degrees.

Therefore, the infrared sensor 102e is structured by using 8-by-8 infrared detecting elements parallel to and perpendicular to the sensor axis, and the sensor axis is inclined at 33.69 degrees (prescribed angle $a_2$) with respect to the scanning axis. Thus, the central positions of all of the infrared detecting elements in the first element string, second element strings, and third element strings, which are validated as part of the infrared detecting elements in eight rows and eight columns constituting the infrared sensor 102e, are different positions when viewed from the direction of the scanning axis, and do not coincide, in the direction of the scanning axis, with the relevant infrared detecting elements in the adjacent row. Therefore, the number of infrared detecting elements in the direction perpendicular to the scanning axis can be increased in the infrared sensor 102e, so the number of pixels in a thermal image can be essentially increased in a direction (vertical axis) perpendicular to the direction of the scanning axis.

Although, in this embodiment, the infrared sensor 102e has been structured by using infrared detecting elements in eight rows and eight columns, this is not a limitation. The plurality of infrared detecting elements may be infrared detecting elements in four rows and four columns, infrared detecting elements in 16 rows and 16 columns, or infrared detecting elements in 32 rows and 32 columns. This is because if the plurality of infrared detecting elements are infrared detecting elements in N rows and N columns (N is a natural number not smaller than 2), the cost of using an infrared sensor that can be obtained as a general-purpose product can be reduced.

Figure 13:
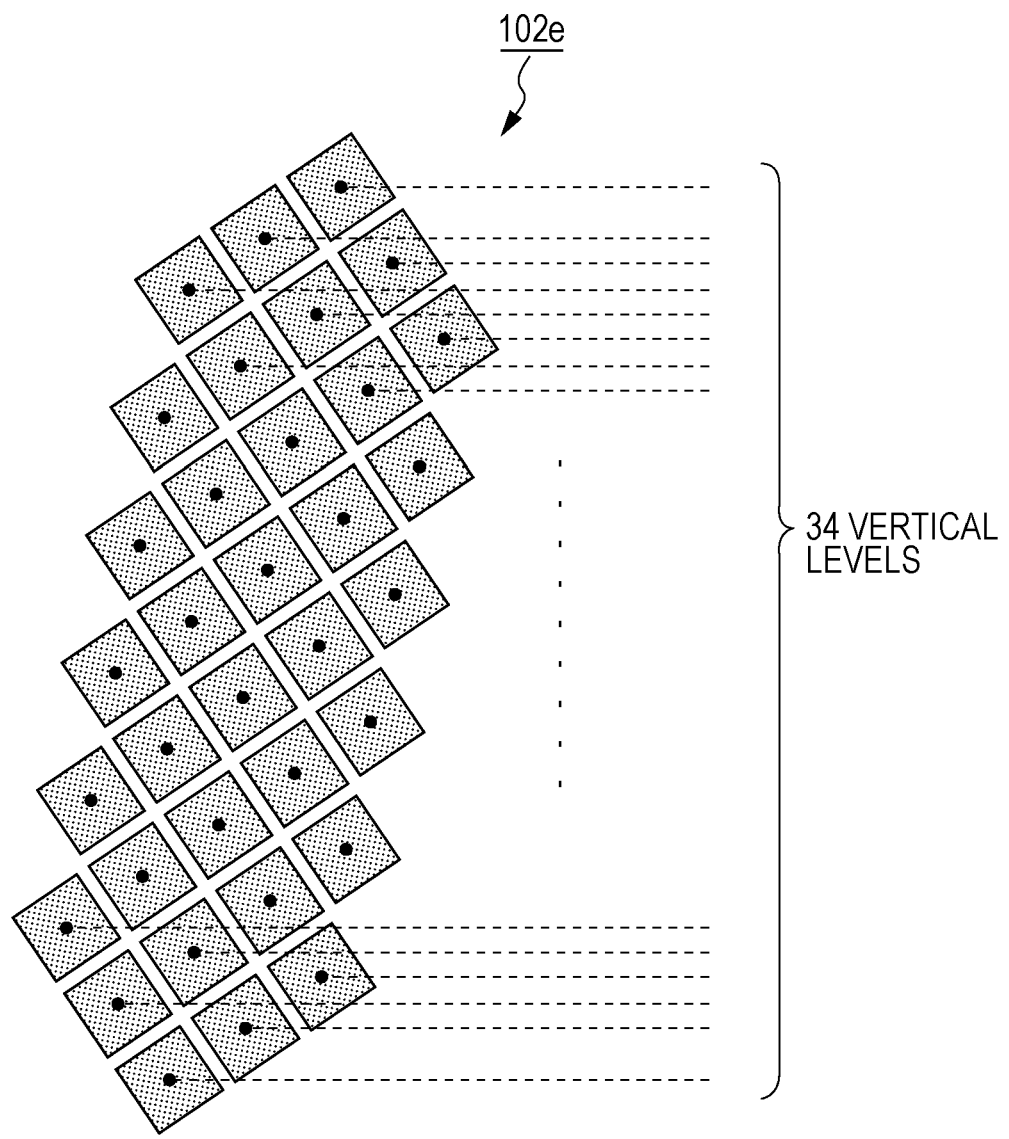
FIG. 13 illustrates an effect of the infrared detecting apparatus when the infrared sensor in FIG. 10 is used.

FIG. 13 illustrates an effect of the infrared detecting apparatus when the infrared sensor 102e in FIG. 10 is used.

The infrared sensor 102e illustrated in FIG. 13 is inclined at 33.69 degrees with respect to the direction of the scanning axis (horizontal direction). That is, the sensor axis of the infrared sensor 102e is inclined at 33.69 degrees with respect to the scanning axis. In this case, when the infrared sensor 102e is rotated (moved) along the direction of the scanning axis, part of the infrared detecting elements parallel to the scanning axis (in the column-wise direction) does not coincide with infrared detecting elements in the adjacent row. Therefore, the number of the part of the infrared detecting elements in the direction perpendicular to the scanning axis is increased from eight (eight vertical levels), which is the number of infrared detecting elements in the infrared sensor 102e in the row-wise direction, to 34 (34 vertical levels).

As described above, since the infrared detecting apparatus 1 has the infrared sensor 102e structured by using infrared detecting elements that have a sensor axis inclined at 33.69 degrees with respect to the scanning axis, the infrared detecting apparatus 1 can obtain thermal images with high resolution, which is by a factor of 4.25 when compared with the comparative example, without increasing the number of infrared detecting elements constituting the infrared sensor 102e. In addition, when super resolution processing is performed on the thermal images in the control processor 12, the infrared detecting apparatus 1 can obtain a thermal image with more improved resolution.

Effects and the Like in the Second Embodiment

As described above, the infrared detecting apparatus in this embodiment can improve the resolution of thermal images without increasing the number of infrared detecting elements constituting an infrared sensor. Furthermore, in this embodiment, only part of a plurality of infrared detecting elements constituting the infrared sensor is used rather than using all of them, so the adverse effects of the coma aberration and spherical aberration caused by a lens used in the infrared sensor to focus infrared light can be reduced.

The prescribed angle is an angle that has been adjusted so that the central positions of all of the part of the plurality of infrared detecting elements constituting the infrared sensor are different positions when viewed from a prescribed angle, which is the scanning direction. If, for example, the infrared sensor is structured by using infrared detecting elements in eight rows and eight columns and only infrared detecting elements in the first element string, second element strings, and third element strings have been validated as part of the infrared detecting elements, the prescribed angle is 33.69 degrees.

In this case, the number of infrared detecting elements, in the three element strings, that are aligned substantially parallel to the scanning axis is smaller than in a case in which all the infrared detecting elements in eight rows and eight columns are used, a scanning time, that is, a time taken to scan the temperature detection range (infrared detection time) can be shortened. This can more improve resolution.

As in the first embodiment, the infrared detecting apparatus in this embodiment not only can eliminate the cost of a motor, which would otherwise be used to obtain thermal images with high resolution, but also can eliminate the cost of using an infrared sensor having more infrared detecting elements. As in the first embodiment, the infrared detecting apparatus in this embodiment can be easily mounted in another apparatus, such as, for example, an air conditioner, as a module.

Third Embodiment

In the first and second embodiments, a case has been described in which the prescribed angle of the infrared sensor included in the infrared detector has been determined in advance. However, this is not a limitation. There may be a case in which the prescribed angle is preferably changed according to the usage situation. If, for example, the infrared sensor is not so distant from a target, the temperature of which is to be detected, in the temperature detection range, high resolution may not be needed. If the infrared sensor is distant from the target, high resolution may be needed. In this embodiment, therefore, an example in which the prescribed angle of the infrared sensor is changed will be described below, focusing on differences from the first and second embodiments.

Structure of the Infrared Detecting Apparatus

Figure 14:
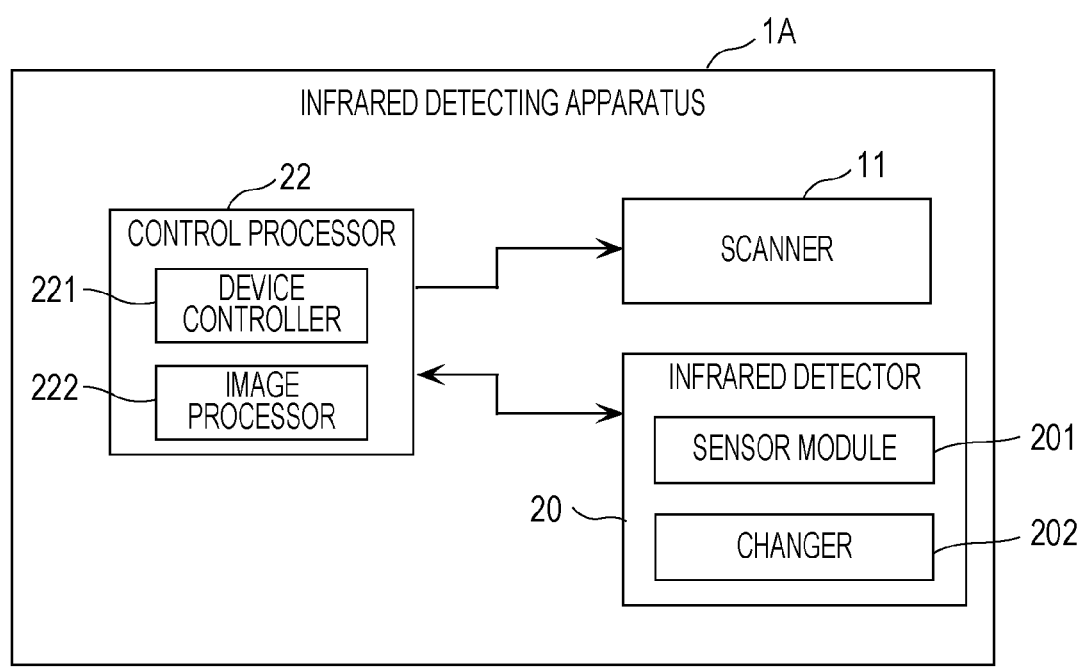
FIG. 14 illustrates an example of the structures of an infrared detecting apparatus in a third embodiment.
Figure 15:
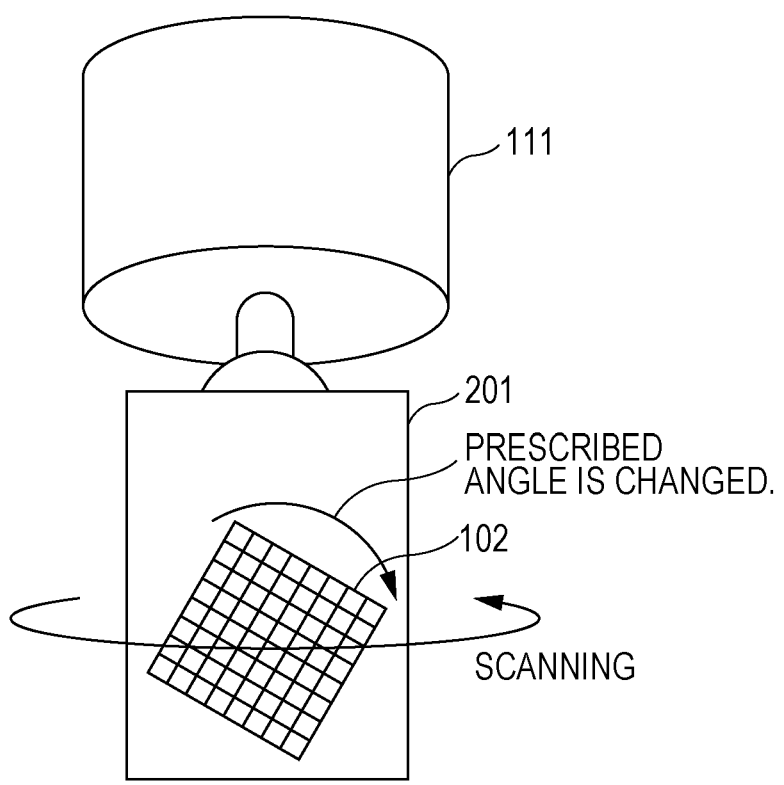
FIG. 15 is a conceptual drawing illustrating the structure of an infrared detector and a scanner in the third embodiment.

FIG. 14 illustrates an example of the structure of an infrared detecting apparatus 1A in the third embodiment. FIG. 15 is a conceptual drawing illustrating the structures of an infrared detector 20 and the scanner 11 in the third embodiment. Elements that are the same as in FIGS. 1 and 2A will be given the same reference characters and their detailed descriptions will be omitted.

The infrared detecting apparatus 1A illustrated in FIG. 14 differs from the infrared detecting apparatus 1 in the first embodiment in the structures of a control processor 22 and the infrared detector 20.

The infrared detector 20 is scanned in a prescribed direction by the scanner 11, the infrared detector 20 can obtain thermal images in the temperature detection range. Specifically, the infrared detector 20 includes an infrared sensor 102 in which a plurality of infrared detecting elements are placed in a matrix, and detects infrared light in the temperature detection range scanned by the infrared sensor 102. In the infrared sensor 102, the plurality of infrared detecting elements are placed so as to be inclined at a prescribed angle with respect to the prescribed direction. The prescribed angle is an angle that has been adjusted so that the central positions of all of validated infrared detecting elements in the plurality of infrared detecting elements constituting the infrared sensor 102 are different positions when viewed from the prescribed direction.

In this embodiment, the infrared detector 20 includes a sensor module 201 and a changer 202 as illustrated in, for example, FIG. 15.

The sensor module 201 includes the infrared sensor 102 and a lens (not illustrated). The lens is as described in the first embodiment, and the infrared sensor 102 is as described in the first and second embodiments, so their descriptions will be omitted.

The changer 202 changes the prescribed angle of the infrared sensor 102 by controlling the sensor module 201 or using a simple motor. The changer 202 also changes an effective area in the infrared sensor 102 included in the sensor module 201 according to the prescribed angle changed. Specifically, the changer 202 validates all of the plurality of infrared detecting elements constituting the infrared sensor 102 or validates only part of them, according to the changed prescribed angle. Since the prescribed angle of the infrared sensor 102 can be changed as described above, the resolution of thermal images (input images) obtained by the infrared detector 20 can be changed.

Assuming that, for example, the infrared sensor 102 is structured by using infrared detecting elements in eight rows and eight columns, if the changer 202 changes the prescribed angle to, for example, 7.125 degrees, the changer 202 validates all of the infrared detecting elements in eight rows and eight columns, which constitute the infrared sensor 102, as illustrated in FIG. 7 or invalidates part of them with the other left validated, as illustrated in FIG. 8 or 9. If the changer 202 changes the prescribed angle to, for example, 33.69 degrees, the changer 202 invalidates infrared detecting elements at both ends of the infrared detecting elements in eight rows and eight columns constituting the infrared sensor 102 in the direction parallel to the scanning axis of the infrared sensor 102 and validates only three element strings, as illustrated in FIG. 11.

The control processor 22 controls the scanner 11 and processes thermal images (input images) obtained by the infrared detector 20. The control processor 22 includes a device controller 221 and an image processor 222, as illustrated in FIG. 14. The control processor 22 controls the changer 202 in the infrared detector 20 and the scanner 11 according to the detection result obtained from the infrared detector 20. The control processor 22 causes the changer 202 to change the prescribed angle according to the result of detection performed by the infrared detector 20, the result being obtained by controlling the scanner 11 so that the infrared sensor 102 scans the detection range. The control processor 22 also controls the scanner 11 so that the infrared sensor 102 with the prescribed angle changed is moved in a prescribed direction and the infrared sensor 102 scans the detection range.

The device controller 221 calculates, from information detected by the infrared detector 20, control information used to control the changer 202 and control information used for control under which the scanner 11 is caused to perform scanning. In this embodiment, the device controller 221 controls the changer 202 so that it changes the prescribed angle of the infrared sensor 102 included in the sensor module 201, according to the calculated control information, after which the device controller 221 controls the scanner 11 according to the calculated control information. In the changing of the prescribed angle of the infrared sensor 102, the device controller 221 performs control according to detection results, such as for a temperature distribution and heat sources in the temperature detection range, which are analyzed from thermal images obtained by the infrared detector 20. If, for example, the infrared sensor 102 is not so distant from a target, the temperature of which is to be detected, in the temperature detection range, high resolution is not needed, so the prescribed angle may be 0 degrees. If the infrared sensor 102 is distant from the target, high resolution is needed, so the prescribed angle may be, for example, 7.125 degrees, 33.69 degrees, or another angle descried above. The prescribed angle may also be changed depending on whether there is a motion.

The image processor 222 performs super resolution processing on thermal images (input images) obtained by the infrared detector 20 and restructures the thermal images (input images) to create a highly precious thermal image (output image). The image processor 222 outputs the created highly precious thermal image, that is, the thermal image on which super resolution processing has been performed. The image processor 222 may change the super resolution processing according to the resolution of the thermal images (input images) obtained by the infrared detector 20. This is because, in this embodiment, the prescribed angle of the infrared sensor 102 included in the infrared detector 20 can be changed as described later, so when the prescribed angle is changed, the resolution of the thermal images (input images) obtained by the infrared detector 20 is also changed. To prevent an adverse effect on a response time taken by the infrared detecting apparatus 1A or a system or apparatus in which the infrared detecting apparatus 1A is incorporated, it is preferable to change the amount of calculation in the super resolution processing performed by the image processor 222 according to the resolution of the thermal images (input images) obtained by the infrared detector 20. The amount of calculation in the super resolution processing performed by the image processor 222 may be changed in response to a command from an application or according to the prescribed angle of the infrared sensor 102. Other descriptions of the image processor 222 will be omitted because they are the same as the descriptions of the image processor 122 in the first embodiment.

Operation of the Infrared Detecting Apparatus

Next, the operation of the infrared detecting apparatus 1A structured as described above will be described.

Figure 16:
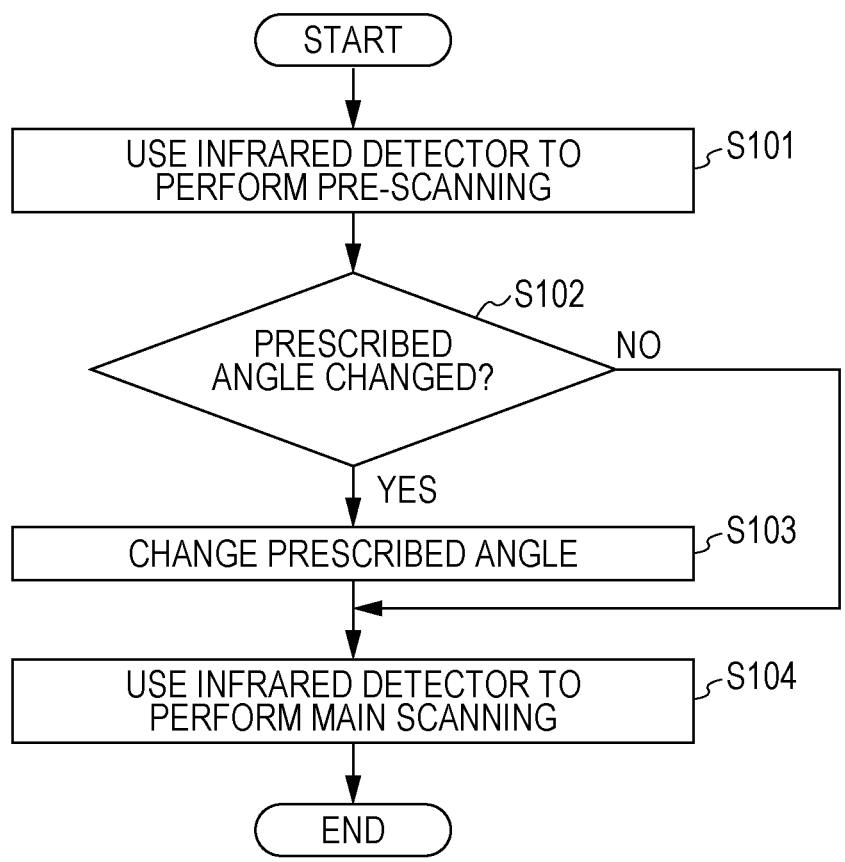
FIG. 16 is a flowchart illustrating the operation of the infrared detecting apparatus in the third embodiment.

FIG. 16 is a flowchart illustrating the operation of the infrared detecting apparatus 1A in the third embodiment.

First, the infrared detecting apparatus 1A uses the infrared detector 10 to perform pre-scanning (simplified scanning) in a temperature detection range (S101). Specifically, the infrared detecting apparatus 1A moves (rotates) the infrared sensor 102 in the infrared detector 10 along the scanning axis so that the infrared sensor 102 performs simplified scanning (pre-scanning) in the temperature detection range and obtains thermal images in the temperature detection range. The sensor axis of the infrared sensor 102 has a prescribed angle that has been determined in advance with respect to the scanning axis or a prescribed angle that was used in the previous scanning. The infrared sensor 102 performs simplified scanning (pre-scanning) by being moved (rotated) by the scanner 11 one sub-pixel at a time or a plurality of sub-pixels at a time, and obtains a plurality of thermal images.

Next, the infrared detecting apparatus 1A decides wither to change the prescribed angle of the infrared sensor 102 (S102). If the infrared detecting apparatus 1A decides to change the prescribed angle (the result in S102 is Yes), the infrared detecting apparatus 1A changes the prescribed angle according to the detection result in the simplified scanning (pre-scanning) (S103). If the infrared detecting apparatus 1A decides not to change the prescribed angle (the result in S102 is No), the infrared detecting apparatus 1A proceeds to S104.

Specifically, the infrared detecting apparatus 1A decides whether to change the prescribed angle according to the detection result from the infrared detector 20, the detection result having been obtained by causing the infrared sensor 102 to scan the detection range in the pre-scanning in S101. Here, it is assumed that the infrared sensor 102 has been structured by using infrared detecting elements in, for example, eight rows and eight columns.

In this case, if the infrared detecting apparatus 1A can determine that heat sources and the like present in the detection range are stationary according to the detection result, the infrared detecting apparatus 1A may change the prescribed angle to, for example, 7.125 degrees. In this case, the infrared detecting apparatus 1A validates all infrared detecting elements in eight rows and eight columns constituting the infrared sensor 102 as illustrated in FIG. 7 and uses the validated infrared detecting elements. Alternatively, the infrared detecting apparatus 1A invalidates infrared detecting elements at both ends in a direction parallel to the scanning axis of the infrared sensor 102 as illustrated in FIG. 8 and may use only the remaining infrared detecting elements. Alternatively, of the infrared detecting elements at both ends in the direction parallel to the scanning axis, the infrared detecting apparatus 1A may validate only infrared detecting elements at both ends in the direction perpendicular to the scanning axis and may invalidate the remaining infrared detecting elements at both ends in the direction parallel to the scanning axis, as illustrated in FIG. 9.

If, for example, the infrared detecting apparatus 1A can determine from the detection result that the heat sources and the like present in the detection range are moving, the infrared detecting apparatus 1A may change the prescribed angle to, for example, 33.69 degrees. In this case, of the infrared detecting elements in eight rows and eight columns constituting the infrared sensor 102, the infrared detecting apparatus 1A invalidates infrared detecting elements at both ends in a direction parallel to the scanning axis of the infrared sensor 102 as illustrated in FIG. 11 and uses only three element strings. This is because, in the scanning of only the three element strings, a scanning time, that is, a time taken to scan the temperature detection range (infrared detection time) can be shortened, and even if the heat sources are moving, precise thermal images can be obtained.

Next, the infrared detecting apparatus 1A uses the infrared detector 10 to scan the temperature detection range (main scanning) (S104). Specifically, the infrared detecting apparatus 1A causes the infrared sensor 102 in the infrared detector 10 to scan the temperature detection range by moving (rotating) the infrared sensor 102 along the scanning axis, and obtains thermal images in the temperature detection range.

In the main scanning, the infrared sensor 102 performs scanning by being moved (rotated) by the scanner 11 one sub-pixel at a time, and obtains a plurality of thermal images in which sub-pixels have been moved one at a time. The sensor axis of the infrared sensor 102 has the prescribed angle that has been determined in advance with respect to the scanning axis or the prescribed angle that has been changed in S103.

The infrared detecting apparatus 1A then performs super resolution processing on the obtained thermal images and outputs a created highly precise thermal image, that is, a thermal image on which super resolution processing has been performed.

Effects and the Like in the Third Embodiment

As described above, the infrared detecting apparatus in this embodiment includes an infrared sensor structured by using infrared detecting elements that have a sensor axis inclined at a prescribed angle with respect to the scanning axis. Thus, it is possible to improve the resolution of thermal images without increasing the number of infrared detecting elements constituting the infrared sensor. Although the prescribed angle can be changed, it has been adjusted so that the central positions of all validated infrared detecting elements in a plurality of infrared detecting elements constituting the infrared sensor are different positions when viewed from a prescribed direction, which matches the scanning direction. When the prescribed angle is changed according to the properties of heat sources present in the detection range (for example, the heat sources are stationary or are moving), the resolution of the thermal images (input images) obtained by the infrared detector 20 can be changed so as to be suitable for the properties of the heat sources present in the detection range.

Fourth Embodiment

The infrared detecting apparatus 1 or 1A described in the first to third embodiments may be mounted in an air conditioner as a module. Then, the air conditioner can use the infrared detecting apparatus 1 or 1A to obtain thermal images representing a temperature distribution in a room in which the air conditioner is attached. Furthermore, the air conditioner can analyze the positions of persons, the positions of heat sources, thermal comfort, and other conditions in the room from the thermal images obtained by the infrared detecting apparatus 1 or 1A and can control any one of an air direction, the amount of air, temperature, and humidity according to the analyzed room conditions.

When the infrared detecting apparatus 1A is mounted in the air conditioner as a module, it is possible to precisely analyze conditions in the room from thermal images that have a resolution changed according to the motions of persons and other heat sources.

As described above, the air conditioner can more precisely grasp conditions in the room by using high-resolution thermal images output from the infrared detecting apparatus 1 or 1A and can thereby perform control suitable for the conditions in the room through, for example, temperature control by which the user feels comfort.

Other Modifications

In the embodiments described above, a plurality of infrared detecting elements placed in a matrix with eight rows and eight columns (8 by 8) have been described as an example of the infrared sensor 102. However, this is not a limitation. A plurality of infrared detecting elements placed in a matrix with 16 rows and 16 columns or 32 rows and 32 columns may be used. The infrared sensor 102 only needs to be structured by using a plurality of infrared detecting elements placed in a matrix with N rows and M columns (N and M are a natural number not smaller than 2).

A device in which the infrared detecting apparatus 1 or 1A described in the first to third embodiments is mounted as a module is not limited to an air conditioner. The infrared detecting apparatus 1 or 1A may be mounted in a security camera or a microwave oven.

Alternatively, the infrared detecting apparatus 1 or 1A may be mounted in an unmanned airplane, in which case the airplane can fly even at night by using high-resolution thermal images output by the infrared detecting apparatus 1 or 1A. For example, the airplane may deliver a baggage to a person or a house at night or may disperse agricultural chemicals in a farm or another place at night.

In the infrared detecting apparatus 1 described in the first and second embodiments, the scanner 11 has been included to implement a method of causing the prescribed angle 102 to scan the detection range. If, however, the prescribed angle 102 is relatively moved in a prescribed direction, a scanner may not be included.

In, for example, a quarantine in an airport or a similar place, if a path is determined for movement of persons and persons move through the path at a constant speed, the infrared detecting apparatus 1 that lacks a scanner can be secured in a certain place in the path. This is because the movement of persons in the path takes the place of the scanner 11 and the infrared sensor 102 can thereby be relatively moved in a prescribed direction. When high-resolution thermal images output from the infrared detecting apparatus 1 are used, it is possible to determine the body temperatures of persons, so the infrared detecting apparatus 1 can be used for medical inspection of persons.

In a case as well in which aligned articles are moved at a constant speed on, for example, a line in a factory, the infrared detecting apparatus 1 that lacks a scanner can be secured in a certain place on the line. This is because the movement of articles on the line takes the place of the scanner 11 and the infrared sensor 102 can thereby be relatively moved in a prescribed direction. When high-resolution thermal images output from the infrared detecting apparatus 1 are used, it is possible to determine the temperatures of articles, so the infrared detecting apparatus 1 can be used for inspection of articles.

So far, the infrared detecting apparatus in one or a plurality of aspects in the present disclosure has been described according to the embodiments. However, the present disclosure is not limited to these embodiments. The range of one or a plurality of aspects of the present disclosure may include embodiments in which various modifications that a person having ordinary skill in the art thinks of are applied to the embodiments described above and may also include embodiments in which constituent elements in different embodiments are combined, without departing from the intended scope of the present disclosure. For example, the following cases are also included in the present disclosure.

(1) Each apparatus described above is specifically a computer system including a microprocessor, a read-only memory (ROM), a random-access memory (RAM), a hard disk unit, a display unit, a keyboard, a mouse, and the like. A computer program is stored in the RAM or hard disk unit in advance. When the microprocessor operates according to the computer program, each apparatus implements its functions. The computer program is a combination of a plurality of instruction codes that issue commands to the computer to achieve prescribed functions.

(2) Part or all of the elements included in each apparatus described above may be structured by using a single system large-scale integration (LSI) chip. A system LSI chip is a super multi-function LSI chip manufactured by integrating a plurality of constituent elements on a single chip. Specifically, a system LSI chip is a computer system including a microprocessor, a ROM, a RAM, and the like. A computer program is stored in the RAM in advance. When the microprocessor operates according to the computer program, the system LSI achieves its functions.

(3) Part or all of the elements included in each apparatus described above may be structured by using an IC card or a standalone module that can be removably attached to the apparatus. The IC card or module is a computer system including a microprocessor, a ROM, a RAM, and the like. The IC card or module may include a super multi-function LSI chip as described above. When the microprocessor operates according to the computer program, the IC card or module achieves its functions. The IC card or module may be tamper resistant.

(4) The present disclosure may be the methods described above, may be a computer program that causes a computer to implement these methods, or may be digital signals forming the computer program.

Alternatively, the present disclosure may be implemented by recording the computer program or digital signals described above on a computer-readable recording medium such as, for example, a flexible disk, a hard disk, a compact disc-read-only memory (CD-ROM), a magnet optical disk (MO), a digital versatile disc (DVD), a DVD-ROM, a DVD-RAM, a Blu-ray (registered trademark) disc (BD), or a semiconductor memory. Alternatively, the present disclosure may be digital signals recorded in any one of these recording medium.

Alternatively, the present disclosure may be implemented by transmitting the computer program or digital signals described above through a telecommunication line, a wireless communication line, a wired communication line, a network typified by the Internet, data broadcasting, or the like.

Alternatively, the present disclosure may be a computer system including a microprocessor and a memory. The memory may store the computer program described above in advance. The microprocessor may operate according to the computer program.

Alternatively, the present disclosure may be practiced by another independent computer system by storing the computer program or digital signals described above on the recording medium described above and transporting the recording medium to the other independent computer system or by transmitting the computer program or digital signals to the other independent computer system through the network described above or the like.

(5) The embodiments and modifications described above may be combined.

The present disclosure can be used in an infrared detecting apparatus that obtains high-resolution thermal images, and more particularly in an infrared detecting apparatus that is mounted in another device such as an air conditioner as a module and controls the other device, in an infrared detection method, and in an air conditioner.

What is claimed is:

1. An infrared detecting apparatus comprising:
an infrared sensor in which a plurality of infrared detecting elements are placed in a matrix; and
a scanner that moves the infrared sensor in a prescribed direction to cause the infrared sensor to scan a detection range, wherein
the infrared sensor is placed so that the matrix of the plurality of infrared detecting elements is inclined at a prescribed angle with respect to the prescribed direction.

2. The infrared detecting apparatus according to claim 1, wherein the prescribed angle is an angle that has been adjusted so that central positions of all of the plurality of infrared detecting elements constituting the infrared sensor are different positions when viewed from the prescribed direction.

3. The infrared detecting apparatus according to claim 1, wherein:
the plurality of infrared detecting elements are placed in the matrix with eight rows and eight columns; and
the prescribed angle is 7.125 degrees.

4. The infrared detecting apparatus according to claim 1, wherein in the infrared sensor, one or more of the plurality of infrared detecting elements are validated and the others are invalidated.

5. The infrared detecting apparatus according to claim 4, wherein the prescribed angle is an angle that has been adjusted so that central positions of the one or more of the plurality of infrared detecting elements are different positions when viewed from the prescribed direction.

6. The infrared detecting apparatus according to claim 5, wherein the prescribed angle is an angle that has been adjusted so that the central positions of the one or more of the plurality of infrared detecting elements are spaced at equal intervals when viewed from the prescribed direction.

7. The infrared detecting apparatus according to claim 5, wherein:
the plurality of infrared detecting elements are a plurality of infrared detecting elements placed in a matrix with N rows and N columns (N is a natural number not smaller than 2); and
the one or more of the plurality of infrared detecting elements are a plurality of infrared detecting elements placed in N rows and L columns (L is smaller than N, and L is a natural number not smaller than 2), in which columns at both ends of the N columns are excluded.

8. The infrared detecting apparatus according to claim 7, wherein:
the plurality of infrared detecting elements are placed in the matrix with eight rows and eight columns;
the one or more of plurality of infrared detecting elements are a plurality of infrared detecting elements placed in the matrix with eight rows and six columns, the six columns being obtained by removing two columns at both ends of the eight columns; and
the prescribed angle is 9.462 degrees.

9. The infrared detecting apparatus according to claim 5, wherein the prescribed angle is an angle that has been adjusted so that the central positions of the one or more of the plurality of infrared detecting elements are spaced at equal intervals when viewed from the prescribed direction.

10. The infrared detecting apparatus according to claim 4, wherein:
the plurality of infrared detecting elements are placed in a matrix with N rows and N columns (N is a natural number not smaller than 2); and the one or more of the plurality of infrared detecting elements is a plurality of infrared detecting elements other than a plurality of infrared detecting elements placed at both ends of the matrix with N rows and N columns in the prescribed direction.

11. The infrared detecting apparatus according to claim 4, wherein:
the plurality of infrared detecting elements are placed in a matrix with N rows and N columns (N is a natural number not smaller than 2); and
the one or more of the plurality of infrared detecting elements includes a first element string, which is a plurality of infrared detecting elements aligned along a first diagonal line, which is one of the two diagonal lines of the matrix with N rows and N columns and forms a larger angle with respect to the prescribed direction, second element strings, each of which is adjacent to the first element string and is aligned along the first diagonal line, and third element strings, each of which is adjacent to one of the second element strings and is aligned along the first diagonal line.

12. The infrared detecting apparatus according to claim 11, wherein:
there is a match between a first distance in a direction perpendicular to the prescribed direction between a central position of a first element, which belongs to the first element string, and a central position of one second element, which belongs to one of the third element strings, and a distance in the direction perpendicular to the prescribed direction between the central position of the first element and a central position of another second element, which belongs to another of the third element strings; and
each of the one second element and the other second element is included in a plurality of infrared detecting elements adjacent to a plurality of infrared detecting elements which include the first element and which are aligned in a row-wise direction inclined at the prescribed angle with respect to the prescribed direction, and is adjacent to the first element in a direction perpendicular to the first diagonal line.

13. The infrared detecting apparatus according to claim 12, wherein there is a match between the first distance and a second distance, which is a distance in the direction perpendicular to the prescribed direction between a central position of a third element, which is one of the one second element and the other second element and which is closer to an end in the scanning direction, and a central position of a fourth element, which belongs to the second element string, the fourth element being included in a plurality of infrared detecting elements which include the first element and which are aligned in the row-wise direction, and being adjacent to the first element in the row-wise direction but not adjacent to the third element in the row-wise direction.

14. The infrared detecting apparatus according to claim 12, wherein there is a match between the first distance and a third distance, which is a distance in the direction perpendicular to the prescribed direction between the central position of the fourth element and a central position of a fifth element, which belongs to one of the second element strings, the fifth element being included in a plurality of infrared detecting elements which include the third element and which are aligned in the row-wise direction, and being adjacent to the third element in the row-wise direction.

15. The infrared detecting apparatus according to claim 11, wherein the prescribed angle is 33.69 degrees.

16. The infrared detecting apparatus according to claim 11, wherein the one or more of the plurality of infrared detecting elements further includes fourth element strings, each of which is adjacent to one of the third element strings and is aligned along the first diagonal line.

17. The infrared detecting apparatus according to claim 1, further comprising:
a changer that is operable to change the prescribed angle of the infrared sensor; and
a control processor that controls the changer and the scanner according to a detection result obtained from the infrared sensor; wherein
the control processor
causes the changer to change the prescribed angle according to a detection result obtained by controlling the scanner so that the infrared sensor scans the detection range, and
causes the infrared sensor to scan the detection range by controlling the scanner so that the infrared sensor with the prescribed angel changed moves in the prescribed direction.

18. An infrared detection method comprising:
scanning a detection range by moving an infrared sensor, in which a plurality of infrared detecting elements are placed in a matrix, in a prescribed direction to cause the infrared sensor to scan the detection range; and
changing a prescribed angle of the infrared sensor; wherein
the infrared sensor is placed so that the matrix of the plurality of infrared detecting elements is inclined at the prescribed angle with respect to the prescribed direction,
in the changing, the prescribed angle is changed according to a detection result obtained by causing the infrared sensor to scan the detection range in the scanning, and
in the scanning, if the prescribed angle is changed in the changing, the infrared sensor with the prescribed angle changed is moved in the prescribed direction so that the infrared sensor is caused to scan the detection range.

19. An air conditioner comprising an infrared detecting apparatus that includes an infrared sensor in which a plurality of infrared detecting elements are placed in a matrix, and also includes a scanner that moves the infrared sensor in a prescribed direction to cause the infrared sensor to scan a detection range; wherein
the infrared sensor is placed so that the matrix of the plurality of infrared detecting elements is inclined at a prescribed angle with respect to the prescribed direction.

* * * * *